US011861518B2

(12) United States Patent
Riddle et al.

(10) Patent No.: US 11,861,518 B2
(45) Date of Patent: Jan. 2, 2024

(54) HIGH FIDELITY PREDICTIONS OF SERVICE TICKET ESCALATION

(71) Applicant: SupportLogic, Inc., San Jose, CA (US)

(72) Inventors: Zach Riddle, San Jose, CA (US);
Andrew Langdon, San Jose, CA (US);
Poonam Rath, San Jose, CA (US);
Charles Monnett, San Jose, CA (US);
Lawrence Spracklen, San Jose, CA (US)

(73) Assignee: SupportLogic, Inc., San Jose, CA (US)

( * ) Notice: Subject to any disclaimer, the term of this patent is extended or adjusted under 35 U.S.C. 154(b) by 233 days.

(21) Appl. No.: 16/914,935

(22) Filed: Jun. 29, 2020

(65) Prior Publication Data

US 2021/0004706 A1 Jan. 7, 2021

Related U.S. Application Data

(63) Continuation-in-part of application No. 16/712,799, filed on Dec. 12, 2019.
(Continued)

(51) Int. Cl.
*G06N 20/00* (2019.01)
*G06Q 10/0631* (2023.01)
(Continued)

(52) U.S. Cl.
CPC .............. *G06N 7/01* (2023.01); *G06F 40/289* (2020.01); *G06F 40/40* (2020.01); *G06N 20/00* (2019.01);
(Continued)

(58) Field of Classification Search
CPC .......... G06N 7/005; G06N 20/00; G06N 7/01; G06F 40/40; G06F 40/30; G06F 40/35;
(Continued)

(56) References Cited

U.S. PATENT DOCUMENTS 6,832,205 B1 12/2004 Aragones et al.
9,000,934 B1 4/2015 Gordin et al.
(Continued)

FOREIGN PATENT DOCUMENTS

WO WO-2019005892 A1 * 1/2019 ............. G06Q 10/04

OTHER PUBLICATIONS

L. Montgomery and D. Damian, "What do Support Analysts Know About Their Customers? On the Study and Prediction of Support Ticket Escalations in Large Software Organizations," 2017 IEEE 25th International Requirements Engineering Conference (RE), 2017, pp. 362-371, doi: 10.1109/RE.2017.61. (Year: 2017).*
(Continued)

*Primary Examiner* — Crystol Stewart
(74) *Attorney, Agent, or Firm* — Dergosits & Noah LLP; Todd A. Noah

(57) ABSTRACT

System derives training change factors for services provided for training product user, priority assigned to training service ticket initiated by training product user, times of service ticket interactions associated with training service ticket, and/or age of training service ticket, and also for times of states of training service ticket. System uses training service ticket and training change factors to train change-based machine-learning model to predict change-based training probability that training product user escalated service for training service ticket. System derives change factors for services provided for product user, priority assigned to service ticket initiated by product user, times of service ticket interactions associated with service ticket, and/or age of service ticket, and also for times of states of training service ticket. System applies change-based machine-learning model to service ticket and change factors to predict change-based probability that product user escalates service for service ticket. System outputs change-based probability.

17 Claims, 4 Drawing Sheets

Related U.S. Application Data

(60) Provisional application No. 62/869,889, filed on Jul. 2, 2019.

(51) Int. Cl.

| | | |
|---|---|---|
| *G06F 40/40* | (2020.01) | |
| *G06Q 10/0637* | (2023.01) | |
| *G06Q 10/0635* | (2023.01) | |
| *G06Q 30/01* | (2023.01) | |
| *G06F 40/289* | (2020.01) | |
| *G06N 7/01* | (2023.01) | |
| *G06Q 10/20* | (2023.01) | |
| *G06Q 10/10* | (2023.01) | |
| *G06Q 30/016* | (2023.01) | |

(52) U.S. Cl.
CPC ... *G06Q 10/0635* (2013.01); *G06Q 10/06312* (2013.01); *G06Q 10/06375* (2013.01); *G06Q 10/063114* (2013.01); *G06Q 10/10* (2013.01); *G06Q 10/20* (2013.01); *G06Q 30/01* (2013.01); *G06Q 30/016* (2013.01)

(58) Field of Classification Search
CPC ..... G06Q 10/063114; G06Q 10/06312; G06Q 10/0635; G06Q 10/06375; G06Q 10/10; G06Q 10/20; G06Q 30/016
See application file for complete search history.

(56) References Cited

U.S. PATENT DOCUMENTS

| | | | |
|---|---|---|---|
| 9,229,800 B2 * | 1/2016 | Jain | H04L 43/045 |
| 9,473,637 B1 | 10/2016 | Venkatapathy et al. | |
| 9,678,817 B1 | 6/2017 | Hasbun Pacheco et al. | |
| 10,438,212 B1 * | 10/2019 | Jilani | G06Q 30/016 |
| 10,498,904 B1 * | 12/2019 | Sandler | H04M 3/4936 |
| 10,887,462 B1 * | 1/2021 | Coyer | G06Q 10/06398 |
| 2003/0046250 A1 | 3/2003 | Kuettner et al. | |
| 2010/0198635 A1 | 8/2010 | Pirtle et al. | |
| 2011/0270770 A1 * | 11/2011 | Cunningham | G06Q 30/016 706/12 |
| 2012/0143564 A1 | 6/2012 | Li et al. | |
| 2013/0268262 A1 | 10/2013 | Moilanen et al. | |
| 2014/0188457 A1 | 7/2014 | Fink et al. | |
| 2014/0245075 A1 | 8/2014 | Dhoolia et al. | |
| 2014/0249872 A1 * | 9/2014 | Stephan | G06Q 10/063 705/7.11 |
| 2015/0254687 A1 | 9/2015 | Konopka et al. | |
| 2015/0254689 A1 | 9/2015 | Amemiya | |
| 2015/0379520 A1 * | 12/2015 | Allen | G06Q 30/016 705/304 |
| 2016/0098480 A1 | 4/2016 | Nowson | |
| 2017/0228366 A1 * | 8/2017 | Bui | G06F 40/247 |
| 2017/0242919 A1 | 8/2017 | Chandramouli et al. | |
| 2017/0353605 A1 * | 12/2017 | Dumaine | G06Q 30/016 |
| 2018/0025743 A1 * | 1/2018 | Childress | G06Q 30/016 704/205 |
| 2018/0131559 A1 | 5/2018 | Tapia et al. | |
| 2018/0276061 A1 | 9/2018 | An et al. | |
| 2018/0374029 A1 * | 12/2018 | Henry | G06Q 30/016 |
| 2019/0213605 A1 | 7/2019 | Patel et al. | |
| 2019/0243899 A1 * | 8/2019 | Yi | G06F 16/00 |
| 2020/0004434 A1 | 1/2020 | Borlick et al. | |
| 2020/0293946 A1 * | 9/2020 | Sachan | G06Q 10/063112 |
| 2020/0401849 A1 * | 12/2020 | Kansal | G06Q 30/016 |

OTHER PUBLICATIONS

L. Montgomery and D. Damian, "What do Support Analysts Know About Their Customers? On the Study and Prediction of Support Ticket Escalations in Large Software Organizations," 2017 IEEE 25th International Requirements Engineering Conference (RE), Lisbon, Portugal, 2017, pp. 362-371 (Year: 2017).*

M. Naveen and S. De, "Efficient Digital Assistant Workflow for Ticket Monitoring and Dispatching," 2022 International Conference on Smart Generation Computing, Communication and Networking (Smart Gencon), Bangalore, India, 2022, pp. 1-6, doi: 10.1109/SMARTGENCON56628.2022.10083722. (Year: 2022).*

Office Action dated Sep. 25, 2020, from related U.S. Appl. No. 16/352,692.

Office Action dated Mar. 1, 2021, from related U.S. Appl. No. 16/512,638.

* cited by examiner

HIGH FIDELITY PREDICTIONS OF SERVICE TICKET ESCALATION

CROSS REFERENCE TO RELATED APPLICATION

This application claims priority under 35 U.S.C. § 119 or the Paris Convention from U.S. Provisional Patent Application 62/869,889, filed Jul. 2, 2019, and is a continuation-in-part of U.S. patent application Ser. No. 16/712,799, filed Dec. 12, 2019, the entire contents of both are incorporated herein by reference as if set forth in full herein.

BACKGROUND

A ticketing system (such as Jira, GitHub, ServiceNow, Salesforce, Zendesk, and Freshdesk) generates tickets, which may be referred to as service tickets or cases, that track the interactions between individuals, users, groups, teams, and businesses in spaces such as support, user service, sales, engineering and information technology. Although many of the following examples are in the context of a ticketing system for a support space, embodiments of this disclosure apply equally to other ticketing systems for other spaces. In an example, a user of a software product experiences a problem using the software product and uses a ticketing system to submit a service ticket to the company which provides services to support the software product. The service company employs a service agent to receive the service ticket and respond to the product user, to maintain strong accountability standards and command user loyalty. In an ideal situation, the service agent accurately identifies, troubleshoots and resolves the product user's problem in a timely manner, and closes the service ticket. However, in a less than ideal situation, the product user may become dissatisfied with the response to the service ticket, relative to the urgency and/importance of the problem, such as looming production failures.

In such a situation, the product user typically has a ticketing system option to escalate the service ticket, which normally results in the immediate addition and reallocation of personnel resources to solve the service ticket's problem. Additionally, if the service company recognizes that a service ticket has been open for an extended period of time because the assigned service agent is unlikely to solve the problem alone and will require additional service company resources such as technical subject matter experts, the service company may escalate the service ticket. The sudden rearrangement of resources created by a service ticket escalation may be costly and disruptive for a service company because of coordination problems, such as the challenge for support teams to leverage relevant experts on short notice, taking into account their existing time commitments and engagements. Consequently, a service company might take insufficient resolution-oriented measures in response to a service ticket escalation, which could result in a product user becoming dissatisfied and ceasing business with the service company, which in turn results in potential losses for the service company.

When responding to an escalation of a service ticket, a service company is reacting after the problems of a service ticket escalation has already occurred, as a product user has already experienced an unsatisfactory response, and damage to the relationship with this product user has already been done. Therefore, providing real-time information about service tickets to a service company may enable the planning and diverting of resources to either prevent impending service ticket escalations or swiftly and successfully resolve an escalated service ticket, thereby preserving good relationships with product users. Typically, service teams manually monitor service tickets over time, but such a manual approach does not scale as the number of service tickets increase. When initiating a service ticket, a product user may use a ticketing system to set the service ticket's priority, which may be reset by the assigned service agent. While a product user might seem to be less likely to escalate a low priority service ticket, which will probably be resolved in a short time, and more likely to escalate a high priority service ticket, the priority set by a product user does not emerge as a strong predictor of service ticket escalation.

DETAILED DESCRIPTION

The weak correlation between the initial priority that a product user assigns to a service ticket and the subsequent escalation of the service ticket is in part due to a lack of consensus between the product user and the assigned service agent on what the priority of the service ticket should be at the outset. This weak correlation may also be due to the product user's emotions decreasing or increasing the product user's perception of a service ticket's priority over time. However, a ticketing system does not record a product user's emotionally changing perception of the priority unless the product user submits such a mental change in priority into the ticketing system.

For a system that predicts escalations of service tickets by focusing predominantly on leveraging metadata about the communications between the two (or more) parties in a service ticket's conversation, the analysis of the resulting escalation predictions may determine that while recall was excellent, the false positive rate could become excessive, if the predictions were executing at the most sensitive level. Detailed analysis of the false positives identified a variety of causes. This disclosure presents additional features that address these causes and thereby both reduce the number of false positives and improve the fidelity of the escalation predictions.

Embodiments herein enable high fidelity predictions of service ticket escalation. A system derives training set change factors for services provided for a training set product user, a priority assigned to a training set service ticket initiated by the training set product user, times of service ticket interactions associated with the training set service ticket, and/or an age of the training set service ticket, and also for times of states of the training set service ticket. The system uses the training set service ticket and the training set change factors to train a change-based machine-learning model to predict a change-based training probability that the training set product user escalated service for the training set service ticket. The system derives change factors for services provided for a product user, a priority assigned to a service ticket initiated by the product user, times of service ticket interactions associated with the service ticket, and/or an age of the service ticket, and also for times of states of the service ticket. The system applies the change-based machine-learning model to the service ticket and the change factors to predict a change-based probability that the product user escalates service for the service ticket. The system outputs the change-based probability.

Figure 1:
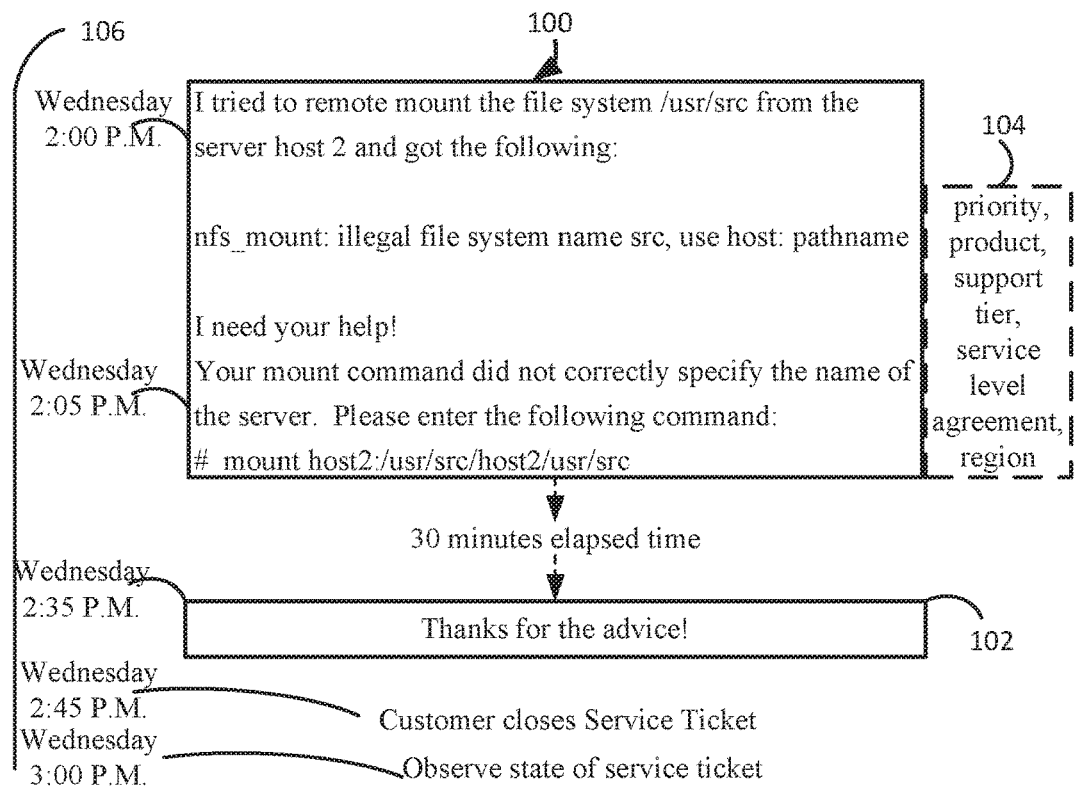
FIG. 1 illustrates a block diagram of an example training data structure for high fidelity predictions of service ticket escalation, under an embodiment.

For example, a training server receives training set data that includes a technical support ticket that contains all subsequent interactions 102 between a software product user Ann and a technical support agent Bob concerning a remote mount problem, and the technical support ticket's metadata 104, as depicted by FIG. 1. Then the training server derives the training set's change factors which indicate that Bob was the only technical support agent who replied to Ann, that Bob did not request any information from Ann, two of their three interactions included machine text, that Ann did not change the ticket's priority, the most recent comment was Ann's response thanking Bob for his advice, and the time series data's timestamps 106 indicate that Ann's thanks was before the first hourly observation of the service ticket's state after the ticket's initiation. The training server uses the technical support ticket's unchanging priority, and the natural language processing of the last comment as Ann's thankful response to Bob's advice within 35 minutes of the service ticket's initiation, which implies that Ann following Bob's advice corrected Ann's problem, to predict a 1% probability that Ann escalated her service ticket within 90 days of initiation. Then the training server accesses the time series data's timestamps 106 which indicate that Ann closed the service ticket on Wednesday at 2:45 P.M., which confirms the training server's 1% escalation prediction.

Figure 2:
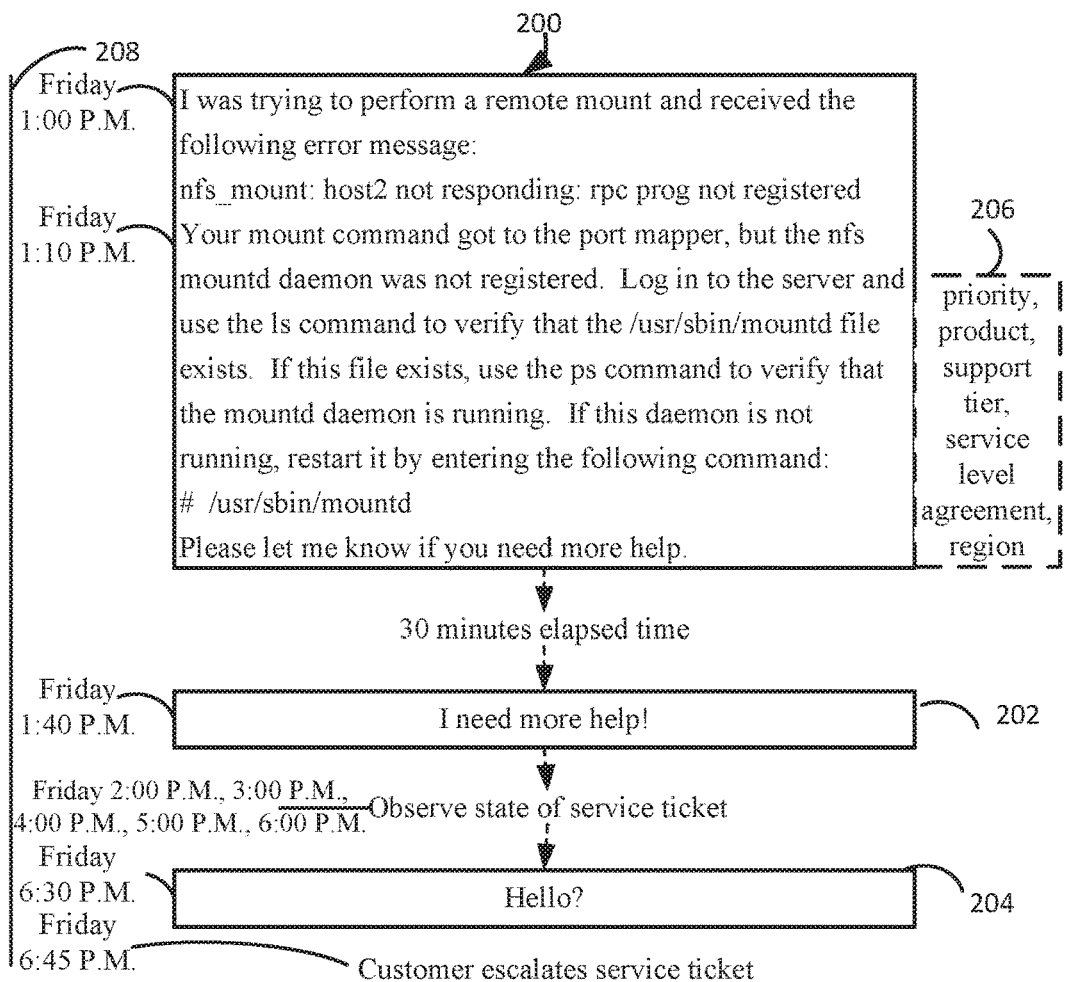
FIG. 2 illustrates a block diagram of an example production data structure for high fidelity predictions of service ticket escalation, under an embodiment.

A production server receives online production data that includes a pending urgent technical support ticket that contains all subsequent interactions 202 and 204 between a software product user Chris and a technical support agent Dana concerning a remote mount problem, and the technical support ticket's metadata 206, as depicted by FIG. 2. Then, the production server derives subsequent change factors which indicate that Chris changes the ticket's priority to urgent, the most recent comments were Chris' second request for help, which implies that Dana's advice was ineffective, and Chris's frustrated "Hello?", the time series data's timestamps 208 which indicate that Chris' implied rejection of Dana's advice was before the first hourly observation of the service ticket's state after the ticket's initiation, and the lack of Dana's reply to Chris' second request for help within the next 5 hourly observations. The production server uses the technical support ticket's new urgent priority, the natural language processing of Chris' frustrated responses to Dana's mount problem advice, which implies that Chris following Dana's advice failed to correct Chris' problem, and the lack of Dana's reply to Chris' responses within 5 hours to predict a 95% probability that Chris will escalate service within the next 4 hours. The production server outputs the prediction of the 95% probability that Chris will escalate service within the next 4 hours, and the explanation that the prediction is based on 1) the last two comments which are Chris' frustrated responses to Dana's mount problem advice, which implies that Chris following Dana's advice failed to correct Chris' problem, 2) the lack of Dana's reply to Chris' responses within 5 hours, and 3) the technical support ticket's new urgent priority.

Being able to predict the escalation probabilities of service tickets more intelligently in real-time can draw attention to those service tickets that might be escalated in the future. These predictions can give a service company sufficient time to be able to redirect or transfer resources to service tickets that need them the most. A timely transfer of resources can prevent the escalations. Integrating such an intelligent system that closely assesses service ticket progression is more robust and reliable than using simple pre-set indicators or round robin mechanisms to allocate resources.

Figure 3:
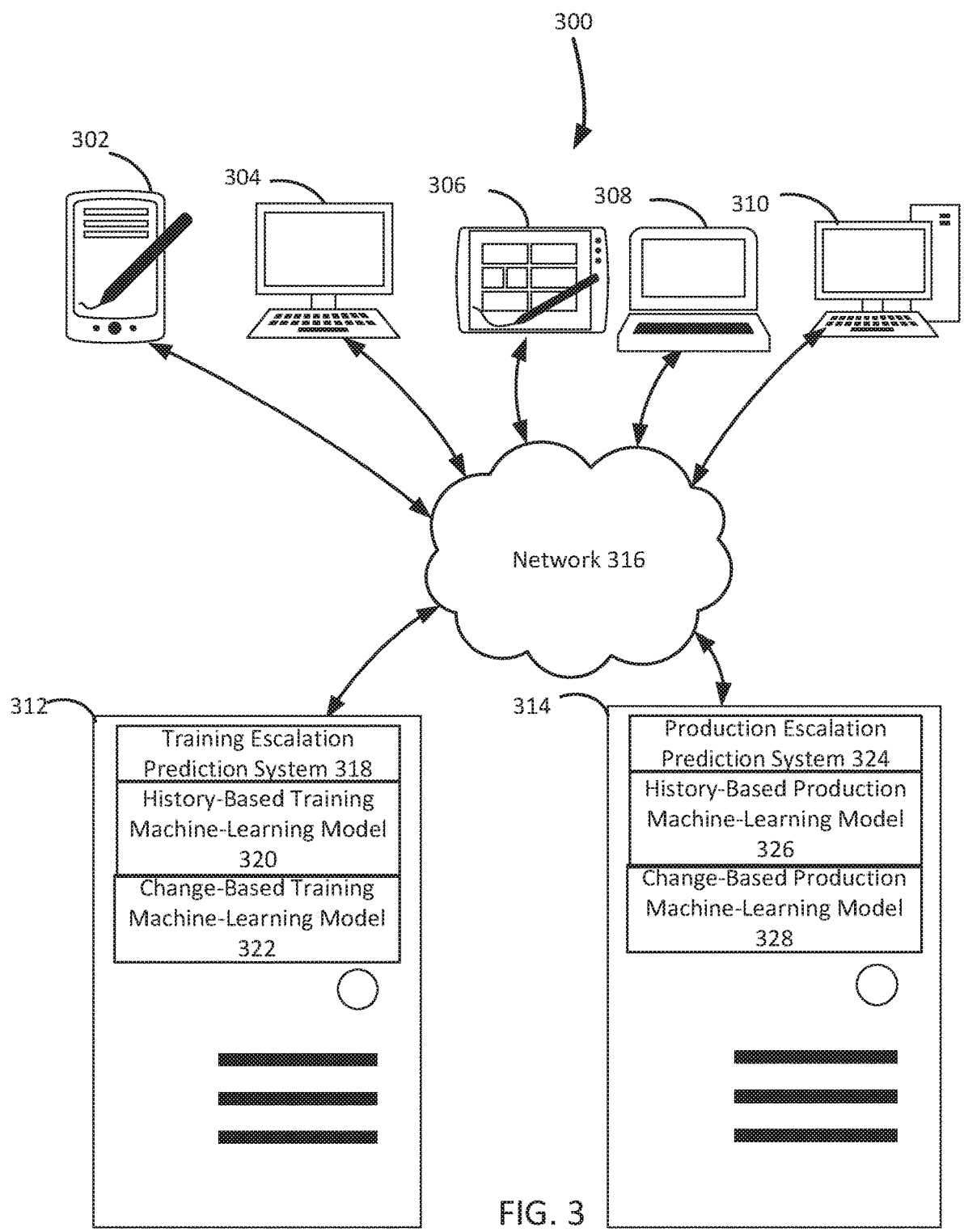
FIG. 3 illustrates a block diagram of an example system for high fidelity predictions of service ticket escalation, under an embodiment.

FIG. 3 illustrates a block diagram of an example system 300 for high fidelity predictions of service ticket escalation, under an embodiment. As shown in FIG. 3, the system 300 may illustrate a cloud computing environment in which data, applications, services, and other resources are stored and delivered through shared data centers and appear as a single point of access for the product users. The system 300 may also represent any other type of distributed computer network environment in which servers control the storage and distribution of resources and services for different client users.

In an embodiment, the system 300 represents a cloud computing system that includes a first client 302, a second client 304, a third client 306, a fourth client 308, a fifth client 310; and a first server 312 and a second server 314 that may be provided by a hosting company. The clients 302-310 and the servers 312-314 communicate via a network 316. The first server 312 may be referred to as the training server 312, and the second server 314 may be referred to as the production server 314. The training server 312 may include a training escalation prediction system 318, which may include a history-based training machine-learning model 320 and a change-based training machine-learning model 322; and the production server 314 may include a production escalation prediction system 324, which may include a history-based production machine-learning model 326 and a change-based production machine-learning model 328. The training escalation prediction system 318 may include the history-based training machine-learning model 320 and the change-based training machine-learning model 322, or the history-based training machine-learning model 320 and the change-based training machine-learning model 322 may be combined into one training machine-learning model. Similarly, the production escalation prediction system 324 may include the history-based production machine-learning model 326 and the change-based production machine-learning model 328, or the history-based production machine-learning model 326 and the change-based production machine-learning model 328 may be combined into one production machine-learning model.

Even though FIG. 3 depicts the first client 302 as a smartphone 302, the second client 304 as a terminal 304, the third client 306 as a tablet computer 306, the fourth client 308 as a laptop computer 308, the fifth client 310 as a personal computer 310, and the servers 312-314 as servers 312-314, each of the system components 302-316 may be any type of computer system. The system elements 302-314 may each be substantially similar to the hardware device 500 depicted in FIG. 5 and described below. While FIG. 3 depicts the system 300 with five clients 302-310, two servers 312-314, one network 316, two escalation prediction systems 318 and 324, two training machine-learning models 320 and 322, and two production machine-learning models 326 and 328, the system 300 may include any number of clients 302-310, any number of servers 312-314, any number of networks 316, any number of escalation prediction systems 318 and 324, any number of training machine-learning models 320 and 322, and any number of production machine-learning models 326 and 328. Although FIG. 3 depicts all of the training elements 318-322 residing completely on the training server 312, any or all of the training elements 318-322 may reside completely on the production server 314, or in any combination of partially on the training server 312, partially on the production server 314, partially on the clients 302-310, such as by residing as data management applications on the clients 302-310, and partially on another server which is not depicted in FIG. 3. While FIG. 3 depicts all of the production elements 324-328 residing completely on the production server 314, any or all of the production elements 324-328 may reside completely on the training server 312, or in any combination of partially on the production server 314, partially on the training server 312, partially on the clients 302-310, such as by residing as data management applications on the clients 302-310, and partially on another server which is not depicted in FIG. 3. After training to predict service ticket escalation, the system 300 may be referred to as the trained system 300.

A product user's decision to escalate a service ticket may be difficult to predict because such a decision is so heavily dependent on human nature. Since every person is unique, each product user has a different tolerance for a delayed resolution of a service ticket. Furthermore, each product user's tolerance varies based on a wide variety of subtle factors. Some of these factors are more quantifiable, including the recent history of the product user's problems, the recent history of the user's service ticket interactions, and the user's perception of the 'appropriate' resolution time for a service ticket. The system 300 can directly derive these factors from the service tickets, and from the record of historical interactions. Emotional factors are more difficult to quantify, including the impact on a product user's work or their business, whether the user is upset because the user was away or on vacation when the problem occurred and still had to respond to the problem, how visible the problem is to the user's supervisor, and the user's stress level. Since these factors are more difficult to capture, the system 300 can use proxies to incorporate the effect of these behavioral components. For example, the 300 system determines whether a product user's sentiment has deviated from their normal sentiment.

The system 300 may determine a product user's normal and current sentiments by exposing an interface to accept individual comments associated with a service ticket as input data points that the system 300 scores based on sentiment. Such a query-able interface includes, but is not limited to, a REST application programming interface (API), a Python API, a web API, or a web user interface. The system 300 may be queried both when a new event occurs for a service ticket, such as when a product user generates a new comment, and at a specified frequency, such as every 4 hours, as time dependent factors may cause the escalation probability to change even when there is no service ticket activity. For example, when a service agent has not responded to a product user's question for 4 hours, the system 300 predicts that the probability of service ticket escalation increases. When a query occurs, the system 300 can internally derive the necessary factors from the service ticket's history and/or subsequent changes to the service ticket, and then output a predicted probability of service ticket escalation. Therefore, the system 300 can predict the probability of service ticket escalation based on information about the service ticket at initiation and/or any combination of information about the product user, the product, the service agent, and the service ticket, which may be at and/or subsequent to the initiation of the service ticket.

The system 300 optionally extracts static initial or history factors about entities associated with a service ticket, such as information about a product user, a product, and an assigned service agent based on when a service ticket was initialized. The history factors may include a product user's escalation history and a product user's engagement score, for both an individual who is product user and an organization that is a product user, a service agent's performance history, a product's escalation history, a product problem's escalation history, a service ticket's region, and a service ticket's original urgency metrics. The system 300 can derive a product user's escalation history based on the number of times the user has escalated a service ticket over a period of time (such as 90 days) divided by the number of service tickets the user has initiated, which captures the unconditional propensity of the user to escalate a service ticket. The system 300 can derive a product user's engagement score based on the number of service tickets initiated by the user, the number of service ticket initiated by the user that are urgent, the number of service tickets initiated by the user after work hours and/or on the weekend, the elapsed time since the user began using the product, the breadth of products used by the user, and whether the user is a partner of the product user organization or eligible for a higher level of support based on the user's service contract. The different regions where service tickets are initiated can have different behavior patterns by the product user, service agent, and/or product, and consequently different escalation patterns.

The system 300 can derive a service agent's history based on the rate at which the service agent who is assigned to the service ticket has internally escalated service tickets for the product user in the past, normalized with respect to the total number of service tickets that the service agent has worked on for the same user. In addition, the system 300 can base the service agent's history on the frequency with which the service tickets assigned to the service agent have been escalated by the product user in the past, which represents a more granular approach to a product user's escalation history, since it is grouped by the service agent. The system 300 can derive the service ticket's original urgency metrics based on whether a service ticket with an urgent priority was initiated after work hours or on the weekend, and the original priority when the service ticket was initiated. The system 300 can also use natural language processing to derive urgency metrics from the service ticket's body. Additionally, the system 300 can use named entity recognition to detect keywords from a service ticket's text, and the keywords can provide information that enables the machine-learning models 320, 322, 326 and 328 to discern between different ticket types that may have different behaviors. For example, a service ticket pertaining to a licensing request probably has an extremely different escalation profile than a ticket related to a production server crash. Rather than just providing detected keywords as a field to one of the machine-learning models 320, 322, 326 and 328, and allowing a single machine-learning model to accommodate these differences, the system 300 can retain a separate machine-learning model for each ticket type or product type.

While predicting an impending escalation of a service ticket is of immense value to a service company, predicting the escalation event well in advance is more actionable since an advance prediction gives the service company enough time to pool resources that may include re-directing the service ticket to the appropriate experts. Different service companies may prefer different windows for time to predicted escalation. Accordingly, the system 300 allows for the selection and tuning of models that perform best on the pre-specified time to escalation window.

The underlying relationships between factors may change over time and this is reflected in changes in the distribution of the factors in the incoming data compared to that of the factors used to train the training machine-learning models 320 and/or 322. Such distributional shifts may be identified along with monitoring model performance. When required, the training machine-learning models 320 and/or 322 may be retrained to remain up to date and capture all the variations in incoming data. In addition, the system 300 can bootstrap the training of the training machine-learning models 320 and/or 322. Since the training machine-learning models 320 and/or 322 demonstrate portability, they may be deployed for service companies that may be newer and have not yet gathered enough historical data to train their customized models.

The system 300 optionally derives a training set's history factors for a training set's product user, who initiated a training set's service ticket, and/or a training set's service agent, who was assigned to the training set's service ticket. The training set's history factors of the training set's product user may be based on any escalations of service and/or any training set service tickets that were initiated by the training set's product user, and any products used by the training set's product user and/or a service level agreement associated with the training set's product user. For example, the training escalation prediction system 318 receives training set data that includes a technical support ticket that contains the initial interactions 100 between the software product user Ann and the technical support agent Bob concerning a remote mount problem, as depicted by FIG. 1, Continuing the example, the training escalation prediction system 318 derives the training set's history factors which indicate that Ann previously initiated 1 technical support ticket, Bob had solved her previous problem in 15 minutes, and Ann's employer purchased a basic service level agreement for the software product, which is the support company's only product that Ann's employer uses. The training set's service ticket may include a training set priority and the context in which the training set's product user assigned the training set priority. For example, Ann assigned a low priority to the technical support ticket when she initiated the ticket on a Wednesday afternoon at 2:00 P.M.

A training set service ticket can be a request that had been logged on a work tracking system detailing an issue that needed to be addressed and that is used as an example for learning. A training set product user can be a person or organization that utilized an item that was sold or leased and who is used as an example for learning. A training set service agent can be a person who was responsible for providing an act of assistance and who is used as an example for learning. A training set history factor can be a group of examples that are used as an example for learning and that had previously contributed to a result. An escalation of service can be a requested increase in a level of assistance. A product can be at item that is sold or leased. A service level agreement can be a contract specifying degrees of support for a product user. A training set priority can be a condition of a thing having been more urgent than other things. A context can be the circumstances that form the setting for an event.

Service ticket escalations arise due to the interaction of multiple entities such as product users, service agents, products, service ticket problems, and service ticket comments. Consequently, the system 300 can index each entity on a time axis to reflect the evolution and changes in the entity's interactions or behavior, and then derive and use cyclical (time-based) factors to enhance the probability predictions of a service ticket escalation.

Since product users may go through the life cycle stages of onboarding. service upgrades, and service downgrades. the system 300 may base the predicted probability of a service ticket escalation on the stage of a product user in the sales cycle. At the initiation of the sales cycle, a product user is likely to be more focused on product exploration, and not be a prolific user. Once a product is fully embedded within a business, then the product user is likely to have upgraded to a service contract with stricter service level agreements, and therefore will have a lower tolerance for delays in service ticket handling, and a higher probability of production-related service ticket escalations. Consequently, the expectations of such product users for service ticket resolution time might vary over the course of the sales cycle. The system 300 can base the predicted probability of a service ticket escalation on additional cyclical information, such as a product user's recent escalation history.

Since service agents may go through the life cycle stages of inexperience, followed by gradual experience building, as well as stages of being assigned to few service tickets and then multiple service tickets, the system 300 can base the predicted probability of a service ticket escalation on the life cycle stage of the service agent assigned to a service ticket. The solution the service agent proposes will depend upon the service agent's life cycle stage that reflects the level of experience and knowledge the service agent has regarding the service ticket's product and the product's problems. As a service agent gains more experience and knowledge about products, the service agent's ability to handle complex service tickets will improve, leading to a downward modulation of the probability of service ticket escalation. The system 300 can base the predicted probability of a service ticket escalation on additional cyclical information, such as a service agent's recent performance.

Since products may go through the life cycle stages of launch, version upgrading, and eventual deprecation, the system 300 may base the predicted probability of a service ticket escalation on the product life cycle stage as part of the product information that is extracted. If a product has been newly launched, there might be more service tickets that are escalated for the new product since both the product users and the service agents might lack the requisite expertise in solving the new product's problems. Some product users with more experience may have tempered expectations regarding the capabilities of new products. The system 300 can base the predicted probability of a service ticket escalation on additional cyclical information, such as a product's recent escalation history. Similarly, product problems and service tickets may go through life cycle stages as similar problems are solved and more information is added in the form of comments.

Once the derived history factors are computed for an input datapoint, the training escalation prediction system 318 optionally trains a classifier model to predict a probability that the product user escalated service for the service ticket. The training escalation prediction system 318 may feed the derived history factors to a variety of models, such as gradient boosted classifiers, k-nearest neighbor classifiers, neural networks, random forests, support vector machines, naive Bayes classifiers, and logistic regression models. For example, the training escalation prediction system 318 uses the derived history factors to train a gradient boosted classifier as a model which produces a score ranging between 0 and 100, where 100 indicates 100% certainty that a service ticket will be escalated within a given time window.

After the derivation of the training set's history factors, the system 300 optionally uses the training set's service ticket and the training set's history factors to train a history-based machine-learning model to predict a history-based training probability that the training set's product user escalated service for the training set's service ticket. The history-based training probability may be further based on any life cycle stages corresponding to the training set's product user, the training set's service agent, and/or the training set's user product. For example, the history-based training machine-learning model 320 uses Ann's history of never escalating a service, Ann's recent stage as a new user in the sales cycle of a software product that has been sold for a significant time, and Bob's recent stage as a senior technical support agent with experience solving the software product's problems to predict a 5% probability that Ann escalated her service ticket within 90 days of initiation.

A history-based training machine-learning model can be an application of artificial intelligence to static data that provides a system with the ability to automatically learn and improve from experience without being explicitly programmed. A history-based training probability can be the learned likelihood of something represented by static data having happened or having been the case. Service can be support for a product user. A life cycle stage can be a phase in a progression through a series of differing phases of development. A training set product can be an item that was sold or leased and that is used as an example for learning.

The system 300 can analyze the comment-based interactions between service agents and product users to identify useful information that has value for predicting the probability of service ticket escalation. For example, the system 300 can predict the probability of a service ticket escalation using only the interactions between a product user and a service agent that are recorded in the service ticket comments. The system 300 can derive additional factors by aggregating on time slices, such as weekday, weekend, early morning, and evening. The system 300 can base the predicted probability of a service ticket escalation on such time slices because a product user might decide to escalate a service ticket on a Friday before leaving work, or on Sunday evening before starting the next week so that the user may follow up on the service ticket's progression. Instead of being constant, escalation rates vary by the time of the day and the day of the week; with customers pushing to get service tickets resolved prior to the end of the day, before morning business hours, or before the weekend. In another example, an increase in a product user's comments during these time slices may be indicative of an increasing urgency on the user's part and, as a consequence, an impending service ticket escalation. Consequently, the system 300 bases the predicted probability of a service ticket escalation on many change factors that are derived after a service ticket is initiated, such as the dynamic change factors for the services provided for the product user, the service ticket's urgency, the times of service ticket activity, the periodically observed states of the service ticket, any modified escalation risk created by the most recent service ticket activity, and the service ticket's age. All of these change factors are embedded within metadata as well as within text data in the ticketing system. A service provided can be support that was supplied to a product user. A day may be a 24-hour time period. A week can be a 7-day time period.

The system 300 can monitor the responsiveness of the provided service based on whether a service ticket comment was from the product user or to the user, and compute the ratio of the number of service ticket comments from the service agent relative to the number of service ticket comments from the product user. The system 300 can use the change-based training machine learning model 322 or the change-based production machine-learning model 328 that takes a mixture of metadata as well as natural language processing on the service ticket comments to derive a "needs attention" score in real time to capture the responsiveness of the provided service, which may in turn impact the service ticket urgency. The system 300 can monitor changes in the variety of the provided service based on the changes in the number of service agents contributing to a service ticket as authors of outbound comments directed from the service company to the product user. The system 300 can perform this monitoring of changes in the variety of the provided service on a rolling-window basis, when looking for a sudden increase in the number of service agents communicating with the product user.

The system 300 can monitor the quality of the provided service, which may indicate the extent to which service agents, engineers, managers and other members of the service company are involved in a service ticket, based on service ticket notes as a fraction of the total outbound service ticket comments. The system 300 can use natural language processing to extract specific categories of service ticket notes, such as service ticket notes that mention explicitly that the service agent is facing a dead-end with the troubleshooting process, or those notes that discuss the wide-ranging impact of the service ticket's problem is a problem for several other service tickets opened for the same product category, or those notes about a manager calling on subject matter experts asking for their input. The system 300 can also compute the proportion of log messages and other categories of machine text exchanged between the product user and the service agent, normalized with respect to the total number of comments in a service ticket. The system 300 can use a dedicated machine learning classifier to identify log messages and various categories of machine text on the basis of statistical differences between human text and machine text. Using statistical as well as natural language processing-based methods to extract such pieces of information from the service ticket can enable the system 300 to quantify the quality of the provided service along various axes. One such example is quantifying how many times the service agent asks for data, which might indicate growing frustration for the product user. Another example is identifying whether the same information was asked of the product user by multiple service agents as time progresses, where the ideal expectation is that every new service agent assigned to the service ticket should build on the context that has already been set prior to their assignment to the service ticket.

The system 300 can monitor the changes in the urgency as a service ticket progresses by using metadata which tracks the service ticket's current priority. This metadata may be set by either the product user or the service agent. A product user's modifications that explicitly increase or decrease the priority assigned to a service ticket can provide insight into the service ticket as time progresses and also impact the probability of escalation. The system 300 can quantify the product user's implied change of urgency by computing the maximum number of consecutive inbound messages directed from the user to the service agent. In addition, the system 300 can base the implied change of urgency on the total comments exchanged between a product user and a service agent during a time window as a proportion of the total comments exchanged since the initiation of the service ticket. The system 300 can factor in the time and the day of week by determining whether a service ticket comment was created during or after work hours and on a weekday or weekend. The system 300 can determine whether a service ticket comment was created during or after work hours based on the product user's time zone, and can evaluate the promptness of the service agent's response based on the service agent's time zone and/or the difference between the product user's time zone and the service agent's time zone. The system 300 can use natural language processing to extract indications of a product user's impatience, frustration, sense of building urgency, and/or references to production issues from the user's service ticket comments.

The system 300 can monitor the frequency of service ticket activity based on the total number of service ticket comments normalized with respect to the service ticket's age, grouped by both the times of inbound service ticket communications and the times of outbound of service ticket communications. The system 300 can also monitor service ticket age, based on the time elapsed between when the service ticket was initiated until the current time.

The system 300 derives the training set's change factors for services provided for the training set's product user who initiated the training set's service ticket, a priority assigned to the training set's service ticket, the times of service ticket interactions with the training set's service agent, the periodically observed states of the service ticket, any modified escalation risk created by the most recent service ticket activity, and/or an age of the training set's service ticket. The training set's service ticket may include interactions between the training set's product user and the training set's service agent subsequent to the training set's service ticket being initiated. The training set's change factors for services provided for the training set's product user may be based on a rate of the training set's responses providing service, the number of the training set's service agents providing service, and/or the quality of the training set's services provided. The quality of the training set's services provided may be based on the number of the training set's service ticket notes relative to the number of the training set's responses providing service, the number of the training set's service ticket interactions that include machine text relative to the number of the training set's service ticket interactions, the number of the training set's service ticket interactions that request information from the training set's product user, and the number of the training set's service ticket interactions that request identical information from the training set's product user. For example, the training escalation prediction system 318 receives training set data that includes the technical support ticket that contains all subsequent interactions 102 between the software product user Ann and the technical support agent Bob concerning the remote mount problem, and the technical support ticket's metadata 104, as depicted by FIG. 1. Continuing the example, the training escalation prediction system 318 derives the training set's change factors which indicate that Bob was the only technical support agent who replied to Ann, that Bob did not request any information from Ann, two of their three interactions included machine text, that Ann did not change the ticket's priority, and the most recent comment was Ann's response thanking Bob for his advice, and the time series data's timestamps 106 which indicate that Ann's thanks was before the first hourly observation of the service ticket's state after the ticket's initiation.

A training set change factor can be an influence that became different and previously contributed to a result and is used as an example for learning. A modification can be a change. A priority can be a condition of a thing being more urgent than other things. A time can be a digital record of the chronology of occurrence of a particular event. An interaction can be a communication with a product user. A service ticket interaction can be a communication with a product user about a request that is logged on a work tracking system detailing an issue that needs to be addressed. A state can be the particular condition that something is in at a specific time. An age can be the length of time that a thing has existed. A rate can be a quantity measured against some other quantity.

A training set's response can be a reply that was made to a request that was logged on a work tracking system detailing an issue that needed to be addressed and is used as an example for learning. A number can be an arithmetical value representing a particular quantity and used in counting and making calculations. Quality can be the degree of excellence of something. A training set's service ticket note can be a brief record about a request that was logged on a work tracking system detailing an issue that needed to be addressed and is used as an example for learning. Machine text can be a set of characters in which a minority of the characters combine to form natural language elements. Information can be data. Identical information can be data that is the same as previous data.

The system 300 can generate different types of training sets for training the change-based training machine-learning model 322 to predict escalations of service tickets. In one type of training set, a single observation either represents the "state" of a service ticket immediately prior to escalation or the state of an un-escalated service ticket prior to its successful resolution. In another type of training set, each of multiple observations are separated in time and capture the state of a service ticket at different points during the service ticket's lifespan. For example, the system 300 can periodically observe the state of a service ticket, with the first observation at the moment that the service ticket is opened, the second observation when the service ticket has been open for 1 hour, the third observation when the service ticket has been open for 2 hours, and so on. An observation is considered to be associated with an escalation if the system 300 determines that a service ticket was found to escalate within a certain time period following the time of the observation, such as if the escalation occurred within 72 hours of the observation.

Instead of being detectable far in advance, most escalations become predictable near the time of escalation because of how the service ticket is progressing. The system 300 can increase the signal for the change-based training machine-learning model 322 by labeling only the service ticket interactions leading up to an escalation, and labeling service ticket interactions farther away from an escalation as "Not Escalation." Compared to observations based on service ticket interactions, time-based observations capture the waiting time between service ticket interactions, which enables the change-based training machine-learning model 322 to use the waiting time between service ticket interactions to help predict when customers are likely to escalate a service ticket. When a customer sends a service ticket question to a service agent, the customer is unlikely to escalate the service ticket within the next 5 minutes. However, the probability that a customer will escalate a service ticket increases the longer that the customer is waiting for a response to the customer's question.

Since multiple observations of the state of a service ticket creates time-series data, evaluating the change-based training machine-learning model 322 uses more criteria than just the standard accuracy, recall, precision. The evaluation of the change-based training machine-learning model 322 identifies how many escalations of service tickets are correctly predicted in advance over a time period, instead of evaluating every single escalation prediction in isolation. For example, the change-based training machine-learning model 322 predicts that a customer will escalate a service ticket in 2 days. This prediction that an escalation will occur in 2 days provides a service team 48 hours to mitigate the escalation threat. Consequently, the escalation prediction would be even more helpful if the advanced warning was 3 days instead of 2 days.

In addition to the approach discussed above, more information about the state of a service ticket may be beneficial to the accuracy of escalation predictions, such as an expected response time, a time duration since the previous service ticket interaction, a time difference between consecutive service ticket interactions from a product user, and counts of negative sentiments and/or expressions of urgency within a preceding time period. Escalation predictions may be based on an expected response time because many customers have different expected response times according to the support tier specified in the customer's service contract, which dramatically impacts the chance of escalation, especially when some support tiers offer support every hour of every day, while other support tiers offer support only during regular business hours. The time duration since the previous service ticket interaction captures the time that a customer or service agent has been waiting since the last service ticket interaction. A time difference between consecutive service ticket interactions from the product user captures an event when a customer sent a flurry of messages, which may be a critical time for a service ticket, especially when the flurry occurs early in a service ticket's lifespan. Therefore, the system 300 may use an exponential decay as a better representation of this metric than a linear difference in time. In addition to using all of a customer's negative sentiments and expressions of urgency to predict the escalation of a service ticket, the system 300 may count the negative sentiments and or the expressions of urgency within a preceding time period, such as the last 24-hours, to reflect changes in the customer's emotions.

An expected response time can be when a reply is anticipated. A time duration can be a measure of a chronological period. A previous service ticket interaction can be a preceding communication between a support agent and a product user about a request that is logged on a work tracking system detailing an issue that needs to be addressed. A time difference can be a chronological measure between events. Consecutive service ticket interactions can be sequential communications between a support agent and a product user about a request that is logged on a work tracking system detailing an issue that needs to be addressed. A count can be a total number of something. A negative sentiment can be an expression of dissatisfaction. An expression of urgency can be a communication about the requirement for swift action. A preceding time period can be the most recent chronological space.

In most instances, the probability of a ticket escalation increases significantly if the final comment in a case is an inbound comment from the customer, because normally a service agent is expected to rapidly respond to any comment by the customer. There are a number of notable exceptions to this expectation of a rapid response to the last comment, which may be identified when evaluation of the most recent service ticket interaction indicates a reduction in the probability of escalation. Therefore, the training set change factors may also include a modified escalation risk created by the most recent service ticket interaction that is a communication of a reply improbability, a third party communication, an automated response, the scheduling of a communication, a communication of a pending closure of a service ticket, a communication of a pending report of work by a product user, and/or a modification of a service level agreement.

A modified escalation risk can be a changed exposure to the possibility of a requested increase in a level of assistance. A most recent service ticket interaction can be the latest communication between a support agent and a product user about a request that is logged on a work tracking system detailing an issue that needs to be addressed. A communication can be a message containing information. A reply improbability can be the unlikelihood of a reply. A third-party communication can be message from a person or group besides the two people or groups who are primarily involved in exchanging messages. An automated response can be a reply that occurs without direct human involvement. A pending closure can be a forthcoming completion of a service ticket. A pending report work can be a forthcoming account of efforts to resolve a problem.

In many service tickets, the customer may indicate that they are planning to be (or already are) out of the office. In these situations, a protracted silence may occur for the service ticket, but the customer is unlikely to escalate the service ticket during the time period when the customer is out of the office. The system 300 can use natural language processing techniques to identify communications indicating that the customer's subsequent replies are improbable, such as the out-of-office messages that are either written by the customer or created by an automated out-of-office response system. The system 300 can use standard off-the-shelf open source software libraries to identify the out-of-office time period from the detected message, use this time period information either as a training set change factor for the change-based training machine-learning model 322, or with a filter before or after the change-based training machine-learning model 322 to remove service tickets in this state from consideration of escalation risks. Optionally, the system 300 can disregard such an out-of-office message if the service ticket seems to be progressing, even during the specified out-of-office time period, or if only one of the customers will be out of the office while the customer's colleagues will continues working on the service ticket.

In many situations, if a third party, such as a person who represents an original equipment manufacturer, is participating in service ticket interactions, then simply evaluating the service ticket interactions as a two-way conversation between a service agent and a customer is overly simplistic. Instead, the system 300 needs to differentiate a third-party communication, such as a comment by a representative for the original equipment manufacturer, from communications by a customer and a service agent. Typically, customer relationship management systems record (and visually depict) service ticket comments as either from a service agent or from a customer, even though some of those 'customer' comments could be from a third-party, such as a representative for the original equipment manufacturer. By analyzing the email address or email signature of comments that are not from a service agent, the system 300 can disambiguate the customer communications and the third-party communications.

There are several situations in which a service agent, a customer, or a third party may reply with an automated response. It is helpful to identify such a situation so that the system 300 does not evaluate such an automated response as part of the back-and-forth conversation. The system 300 can use the identification of automated responses as a training set change factor for the change-based training machine-learning model 322, or with a filter before or after the change-based training machine-learning model 322 to remove service tickets in this state from consideration of escalation risks In many service tickets, a customer and a service agent may agree to synchronize communications on a future date, such as "Let's jump on a Zoom/WebEx call on Friday." Once a customer and a service agent agree to communicate on a scheduled date and time, there may be a period of quiet in the service ticket until that scheduled date and time. The system 300 can use natural language processing techniques to identify the occurrence of scheduling of a communication and identify the associated time and date. When a service ticket enters such a waiting period, the system 300 can use the identification of the scheduling of a communication as a training set change factor for the change-based training machine-learning model 322, or apply a filter before or after the change-based training machine-learning model 322 to the scheduling of a communication to remove service tickets in this state from consideration of escalation risks.

In many instances, even when a service ticket's problem has been resolved, a customer may indicate that the service ticket may be closed at a service agent's leisure, or may indicate that the service ticket should be left open for some period of time, just in case the problem reoccurs, such that the service ticket may be left open for a significant period of time. When a service ticket is in this pending closure state, the number of comments drops, but there is a significantly reduced risk of escalation. The system 300 can use natural language processing techniques to identify a pending closure request or a discussion about holding a service ticket open for some period of time, or even until a correction is released, and use the identification of a pending closure as a training set change factor for the change-based training machine-learning model 322. Alternatively, the system 300 can apply a filter before or after the change-based training machine-learning model 322 to the pending closure request to remove service tickets in this state from consideration of escalation risks.

In some instances, a customer will respond to a service agent by indicating that the customer will undertake some additional work or analysis on the service ticket and then report the results of this pending work to the support agent. In these situations, a customer will be actively working on a service ticket and is not waiting for a response from a service agent. The system 300 can use natural language processing techniques to identify these expressions of a pending report of work in the customers comments by determining whether a customer comment includes a question that requires a response from a service agent, or the customer is providing the service agent with a update of plans the customer has to work on the service ticket. The system 300 can use this communication of a pending report of work as a training set change factor for the change-based training machine-learning model 322, or with a filter before or after the change-based training machine-learning model 322 to remove service tickets in this state from consideration as escalation risks.

Some service organizations, especially those that offer service level agreements that have stringent follow up requirements, may provide the functionality for a service agent to negotiate customized requirements for a service level agreement that applies to a customer's service ticket. For example, a service agent may suggest to the customer that if the service agent has to interrupt work on a solution to the customer's problem so that the service agent can provide the customer with the update within the time required by the service level agreement, then this interruption may delay the service agent resolving the customer's problem. Consequently, the service agent may negotiate with the customer, who can agree that even though the existing service level agreement requires the service agent to periodically update the customer with progress within a specific time period, such as within the next 4 hours, the customer will not require the service agent to provide the next update until some set time in the future that is after the specific time period has expired, such as within the next 6 hours. For service tickets which have this relaxed reporting requirement in a modified service level agreement, there may be protracted absence in service ticket interactions until the revised update time occurs, potentially making the service ticket appear to be an escalation risk. Until the revised update time has elapsed, the system 300 can use this modification of a service level agreement as a training set change factor for the change-based training machine-learning model 322, or with a filter before or after the change-based training machine-learning model 322 to remove service tickets in this state from consideration as escalation risks.

In the situations described above, instead of analyzing an entire service ticket, the system 300 can analyze the last comment (or short sequence of comments) to determine if the service ticket has entered a state with a lower escalation risk. After the service ticket conversation progresses and these comments are part of the historical record, these comments' impact on the prediction of escalation is muted, and should not be considered to have such a pronounced impact on the service ticket.

In many instances, especially when a service level agreement requires a service agent to respond to a customer's comment within a relatively short amount of time, or provide progress updates to the customer at a prescribed frequency, the service agent may seem to comply with these requirements, but there may be little (or no) substance in these responses or updates. For example, if a service agent repeatedly responds "Still investigating; will get back to you," the service ticket may have constant activity, but the customer may still escalate the service ticket because of the apparent lack of tangible progress. If an escalation predictor is only focused on the metadata associated with the service ticket interactions, such empty responses and updates may cause the service ticket to appear healthy and under control. The system 300 can calculate the change-based probability of service ticket escalation based on applying natural language processing to the service ticket interactions to identify a lack of progress with a problem associated the service ticket, which would detect the "empty" responses and updates. The system 300 can use any detected "empty" responses and updates as a training set change factor for the change-based training machine-learning model 322, or with a filter before or after the change-based training machine-learning model 322 to process service tickets in this state as escalation risks.

In addition to detecting empty responses and updates, the system 300 can identify other key expressions that may provide insight into the health of a service ticket. For example, the system 300 can calculate the change-based probability of service ticket escalation based on applying natural language processing to the service ticket interactions to identify a lack of progress with the major problem of a service ticket, such as customer comments indicating that the suggested solutions "did not work", or "were not helpful." Natural language processing can be a subfield of linguistics, computer science, and artificial intelligence concerned with the interactions between human communications and computers, particularly how to program computers to process and analyze large amounts of human communication data. A lack of progress can be the absence of a resolution to a problem.

In many instances, these factors could be added as an input to for the change-based training machine-learning model 322 in the form of engineered features. However, a filter before or after the change-based training machine-learning model 322 may be preferable, as such a filter provides additional flexibility. For example, filters may be tweaked and tuned in real-time, without necessitating a retraining of the change-based training machine-learning model 322, which may be an expensive and time-consuming operation. Similarly, in many instances, if a single machine-learning model is deployed across multiple customers, the feature set used by the machine-learning model frequently defaults to the lowest common denominator, such as the feature set that is available across all customers. The system 300 can apply a filter before or after the change-based training machine-learning model 322 to leverage additional information for customers where this is available, or to tailor the change-based training machine-learning model 322 and its predictions to the nuances of the individual customer environments.

Once the training set's derived change factors are computed for the input datapoint, the system 300 trains a classifier model to predict a probability that the product user escalated service for the service ticket. The system 300 may feed the training set's change factors to a variety of models, such as gradient boosted classifiers, k-nearest neighbor classifiers, neural networks, random forests, support vector machines, naive Bayes classifiers, and logistic regression models. For example, the system 300 uses the training set's change factors to train a gradient boosted classifier as a model which produces a score ranging between 0 and 100, where 100 indicates 100% certainty that the service ticket was escalated within a given time window.

The system 300 uses the training set's service ticket and the training set's change factors to train a change-based machine-learning model to predict a change-based training probability that the training set's product user escalated service for the training set's service ticket. The change-based training probability may be also based on any life cycle stages corresponding to the training set's service ticket and/or the training set's product problem. For example, the change-based training machine-learning model 322 uses the technical support ticket's unchanging priority, and the natural language processing of the last comment as Ann's thankful response to Bob's mount problem advice within 35 minutes of the service ticket's initiation, which implies that Ann following Bob's advice corrected Ann's problem, to predict a 1% probability that Ann escalated her service ticket within 90 days of initiation. Then the change-based training machine-learning model 322 accesses the time series data's timestamps 106 which indicate that Ann closed the service ticket on Wednesday at 2:45 P.M., which confirms the 1% escalation prediction made by the change-based training machine-learning model 322. A change-based training machine-learning model can be an application of artificial intelligence to dynamic data that provides a system with the ability to automatically learn and improve from experience without being explicitly programmed. A change-based training probability can be the learned likelihood of something represented by dynamic data having happened or having been the case. A training set product problem can be an issue that existed for item that was sold or leased and that is used as an example for learning.

The training escalation prediction system 318 optionally derives factors that are a mix of static history factors (which are factors defined at the initiation of a service ticket and factors that are independent of the service ticket) and subsequent change factors based on the dynamic changes to the service ticket as time progresses. Therefore, the training escalation prediction system 318 can use a combination of two separate models—the history-based training machine-learning model 320 that is trained on static history factors, and the change-based training machine-learning model f322 that is trained on dynamic change factors. The training escalation prediction system 318 can invoke the history-based training machine-learning model 320 when a service ticket is initiated, and then invoke the change-based training machine-learning model 322 when the service ticket's age reaches a pre-set threshold. The training escalation prediction system 318 can execute both training machine-learning models 320 and 322 simultaneously on a single service ticket, and then use a weighted sum of the escalation prediction probabilities from both training machine-learning models 320 and 322 as the final training prediction of escalation probability. The system 300 optionally creates a combined training probability based on the history-based training probability and the change-based training probability. For example, the training escalation prediction system 318 combines the prediction of the 5% probability, which is based on the training set's history factors, with the prediction of the 1% probability, which is based on training set's change factors, to result in a prediction of a weighted 2.5% probability, which is based on a mix of training set factors, that Ann escalated her service ticket within 90 days of initiation. The training escalation prediction system 318 optionally uses the combined training probability, the history-based training probability, and/or the change-based training probability to train the training machine-learning models 320 and/or 322. A combined training probability can be the merging of learned likelihoods of something having happened or being the case.

Additionally, the training escalation prediction system 318 can employ final filtering steps that allow per-instance nuances to be taken into consideration. For example, after a service ticket's problem has been resolved, support engineers may leave the service ticket open for a few days in order to ensure that the proposed correction to the problem actually resolved the product user's problem. A service ticket that is in this final stage of its life cycle is unlikely to be escalated. The training escalation prediction system 318 can reduce the predicted probability of escalation for such a service ticket by examining service ticket metadata (such as service ticket status fields) or leveraging natural language processing techniques to detect this situation in the text of the final comments in the service ticket. Furthermore, a product user may inform a service agent that a service ticket may be closed for a variety of reasons, such as the problem was resolved, the problem is no longer an issue, or the problem disappeared. In these situations, the service ticket is unlikely to be escalated before the service ticket is finally closed by the service agent. The training escalation prediction system 318 can reduce the predicted probability of escalation for such a service ticket by using natural language processing techniques to analyze the final comments of the service ticket to determine whether such closure requests have been made.

As described above, the system 300 can detect a modified escalation risk created by the most recent service ticket interaction for the training set service ticket, which may be a communication of a reply improbability, a third party communication, the scheduling of a communication, a communication of a pending closure of the training set service ticket, a communication of a pending report of work by the training set product user, and/or a modification of a service level agreement. In many instances, these factors could be added as an input to for the change-based training machine-learning model 322 in the form of engineered features. However, a filter before or after the change-based training machine-learning model 322 may be preferable, as such a filter provides additional flexibility. For example, filters may be tweaked and tuned in real-time, without necessitating a retraining of the change-based training machine-learning model 322, which may be an expensive and time-consuming operation. Similarly, in many instances, if a single machine-learning model is deployed across multiple customers, the feature set used by the machine-learning model frequently defaults to the lowest common denominator, such as the feature set that is available across all customers. The system 300 can apply a filter before or after the change-based training machine-learning model 322 to leverage additional information for customers where this is available, or to tailor the change-based training machine-learning model 322 and its predictions to the nuances of the individual customer environments.

Furthermore, the system 300 can use subtle filtering, which is applying filters to escalation predictions only if the factors driving the escalation predictions are relevant to the purpose of a specific filter. For example, the system 300 predicts that a training set service ticket with a modified service level agreement will be escalated after the original update requirement time of within the next 4 hours but before the modified update requirement time of within the next 6 hours. If the factors driving the escalation prediction are related to the service agent's responsiveness for updates, then the system 300 should apply the relaxed update requirement filter to the escalation prediction. However, if the factors driving the escalation prediction involved increased expressions of urgency by the customer, then the system 300 should ignore the application of the relaxed update requirement filter, which is less relevant.

If any filters are applied to a modified escalation risk, the system 300 can use the modified escalation risk to modify the output of the change-based probability. For example, the system 300 uses a filter to suppress the predicted probability of Ann escalating her service ticket 100, because although the last comment 102 was from the customer and not answered, this last comment 102 from Ann implies that following Bob's advice corrected her problem, unlike the last comments in service tickets that are from customers and are not answered, which typically increase the predicted escalation probabilities. If no filters are applied to a modified escalation risk, the system 300 can use the modified escalation risk as a change factor that the change-based training machine-learning model 322 uses to modify the change-based probability. For example, the system 300 uses the last comment 102 from Ann, which implies that following Bob's advice corrected her problem, to reduce the predicted 2% probability of Ann escalating her service ticket 100 to a reduced 1% probability. An output can be the producing, delivering, or supplying of data using a computer.

The training escalation prediction system 318 stores the results of the training machine-learning models 320 and/or 322, which may be queried via REST endpoints or made accessible via a user interface. This enables the training escalation prediction system 318 to provide a list of any associated static history factors and/or any dynamic change factors, ranked by importance, that explain why the training machine-learning models 320 and/or 322 have predicted a particular probability of escalation for a service ticket associated with a specific point in time. The training escalation prediction system 318 can generate this list of relevant history and change factors using a process that analyzes localized predictions for perturbations around the input datapoint and computes model-agnostic explanations for the prediction.

The system 300 can train the training machine-learning models 320 and/or 322 without human supervision, because whether or not service was escalated for a training set's service ticket is readily available in the training set that includes many service tickets and their associated data. The amount of the training set's service tickets may be selected to provide sufficient data points so that the training server 312 can automatically train the training machine-learning models 320 and/or 322 to learn to predict escalations of service for the training set's service tickets. After the system 300 completes the training of the training machine-learning models 320 and/or 322, the system 300 deploys any sufficiently trained machine-learning models as the production machine-learning models 326 and/or 328.

Then, the system 300 optionally derives history factors for a product user, who initiated a service ticket, and/or a service agent, who is assigned to the service ticket. The service ticket can include a priority and a context in which the product user assigned the priority. The history factors for the product user may be based on any escalations of service and/or any service tickets that were initiated by the product user, and any products used by the product user and/or a service level agreement associated with the product user. For example, the production escalation prediction system 324 receives online production data that includes a pending urgent technical support ticket that contains the initial interactions 200 between the software product user Chris and the technical support agent Dana concerning a remote mount problem, as depicted by FIG. 2, Continuing the example, the production escalation prediction system 324 derives history factors which indicate that Chris previously initiated 19 technical support tickets and escalated 9 of these tickets, Dana was the technical support agent for all of Chris' tickets, and Chris' employer upgraded to a stricter service level agreement for the software product, which is among 5 of the support company's products that Chris' employer uses.

A service ticket can be a request logged on a work tracking system detailing an issue that needs to be addressed. A product user can be a person or an organization that utilizes an item that was sold or leased. A service agent can be a person who is responsible for providing an act of assistance. A history factor can be a past influence that contributes to a result.

Once the derived history factors are computed for an input datapoint, the system 300 optionally applies a trained classifier model to predict a probability that the product user will escalate service for the service ticket. The system 300 may feed these history factors to a variety of models, such as gradient boosted classifiers, k-nearest neighbor classifiers, neural networks, random forests, support vector machines, naive Bayes classifiers, and logistic regression models. For example, the system 300 applies history factors to a gradient boosted classifier as a trained model which produces a score ranging between 0 and 100, where 100 indicates 100% certainty that the service ticket will be escalated within a given time window.

The system 300 optionally applies the history-based trained machine-learning model to the service ticket and the history factors to predict a history-based probability that the product user escalates service for the service ticket. The history-based probability may also be based on any life cycle stages corresponding to the product user, the service agent, and/or the product. For example, the history-based production machine-learning model 326 uses Chris' history of frequently escalating services, including when Dana was the technical support agent, Dana's recent stage as a junior technical support agent with limited experience solving the software product's problems, and Chris' employer upgrade to a stricter service level agreement for the software product to predict a 45% probability that Chris will escalate service within the next 4 hours. A history-based machine-learning model can be an application of artificial intelligence to static data that provides a system with the ability to automatically learn and improve from experience without being explicitly programmed. A history-based production machine-learning model can be an application of artificial intelligence to static data that provides a system with the ability to automatically learn and improve from experience without being explicitly programmed. A history-based probability can be the learned likelihood of something represented by static data happening or being the case. Escalating service can be requesting an increase in a level of assistance.

The system 300 optionally outputs the history-based probability that the product user escalates service for the service ticket. Outputting the history-based probability may include outputting an explanation why a list of any relevant history factors, ranked by importance, resulted in the prediction of the history-based probability. An explanation may be tied to a workflow, such as suggesting and facilitating actions based on the explanation, Outputting the history-based probability that the product user escalates service for the service ticket may include identifying service tickets which are similar to the service ticket and outputting any relevant history factors associated with any identified service tickets which averted escalated service or efficiently handled escalated service, For example, the history-based production machine-learning model 326 outputs the prediction of the 45% probability that Chris will escalate service within the next 4 hours, and the explanation that the prediction is based on 1) Chris' history of frequently escalating services, 2) Dana's limited experience solving the software product's problems, and 3) the stricter service level agreement for the software product.

An explanation can be a statement or account that makes something clear. A list can be a number of connected items written or printed consecutively. A relevant history factor can be a pertinent past influence that contributes to a result. Importance can be a condition of having a level of significance. A prediction can be a forecast or an estimate. An identified service ticket can be a recognized request logged on a work tracking system detailing an issue that needs to be addressed. Escalated service can be an increased level of support.

The system 300 derives change factors for services provided for a product user who initiated a service ticket, a priority assigned to the service ticket, times of service ticket interactions with a service agent, the periodically observed state of escalation for the training set's service ticket, any modified escalation risk created by the most recent service ticket activity, and/or an age of the service ticket. The change factors for services provided by the service agent to the product user may be based on a rate of responses providing service, the number of service agents providing service, and/or a quality of services provided. The quality of services provided may be based on the number of service ticket notes relative to the number of responses providing service, the number of service ticket interactions that include machine text relative to the number of the service ticket interactions, the number of service ticket interactions that request information from the product user, and/or the number of service ticket interactions that request identical information from the product user. For example, the production escalation prediction system 324 receives online production data that includes the pending urgent technical support ticket that contains all subsequent interactions 202 and 204 between the software product user Chris and the technical support agent Dana concerning the remote mount problem, and the technical support ticket's metadata 206, as depicted by FIG. 2. Continuing the example, the production escalation prediction system 324 derives subsequent change factors which indicate that Chris changes the ticket's priority to urgent, the most recent comments were Chris' second request for help, and Chris's frustrated "Hello?", the time series data's timestamps 208 which indicate that Chris' implied rejection of Dana's advice was before the first hourly observation of the service ticket's state after the ticket's initiation, and the lack of Dana's reply to Chris' second request for help within the next 5 hourly observations. A change factor can be an influence that becomes different and contributes to a result.

Once the derived change factors are computed for an input datapoint, the system 300 applies a trained classifier model to predict a probability that the product user will escalate service for the service ticket. The system 300 may feed these change factors to a variety of models, such as gradient boosted classifiers, k-nearest neighbor classifiers, neural networks, random forests, support vector machines, naive Bayes classifiers, and logistic regression models. For example, the system 300 applies the change factors to a gradient boosted classifier as a trained model which produces a score ranging between 0 and 100, where 100 indicates 100% certainty that the service ticket will be escalated within a given time window.

The system 300 applies the change-based machine-learning model to the service ticket and the change factors to predict a change-based probability that the product user escalates service for the service ticket. The change-based probability may also be based on any life cycle stages corresponding to the service ticket and/or a product problem. For example. the change-based production machine-learning model 328 uses the technical support ticket's new urgent priority, the natural language processing of Chris' frustrated responses to Dana's mount problem advice, which implies that Chris following Dana's advice failed to correct Chris' problem, and the lack of Dana's reply to Chris' responses within 5 hours to predict a 95% probability that Chris will escalate service within the next 4 hours.

A product problem can be an issue for item that is sold or leased. A change-based machine-learning model can be an application of artificial intelligence to dynamic data that provides a system with the ability to automatically learn and improve from experience without being explicitly programmed. A change-based production machine-learning model can be an application of artificial intelligence to dynamic data that provides a system with the ability to automatically learn and improve from experience without being explicitly programmed. A change-based probability can be the learned likelihood of something represented by dynamic data happening or being the case.

The system 300 outputs the change-based probability that the product user escalates service for the service ticket. Outputting the change-based probability may include outputting an explanation why a list of any relevant change factors, ranked by importance, resulted in the prediction of the change-based probability. Outputting the change-based probability that the product user escalates service for the service ticket may include identifying service tickets which are similar to the service ticket and outputting any relevant change factors associated with any identified service tickets which averted escalated service or efficiently handled escalated service, For example, the change-based production machine-learning model 328 outputs the prediction of the 95% probability that Chris will escalate service within the next 4 hours, and the explanation that the prediction is based on 1) the last two comments which are Chris' frustrated responses to Dana's mount problem advice, which implies that Chris following Dana's advice failed to correct Chris' problem, 2) the lack of Dana's reply to Chris' responses within 5 hours, and 3) the technical support ticket's new urgent priority. A relevant change factor can be a pertinent influence that becomes different and contributes to a result.

The production escalation prediction system 324 optionally derives factors that are a mix of static history factors (which are factors defined at the initiation of a service ticket and factors that are independent of the service ticket) and subsequent factors based on the dynamic changes to the service ticket as time progresses. Therefore, the production escalation prediction system 324 can use a combination of two separate models—the history-based production machine-learning model 326 that was trained on static history factors, and the change-based production machine-learning model 328 that was trained on dynamic change factors. The production escalation prediction system 324 can invoke the history-based production machine-learning model 326 when a service ticket is initiated, and then invoke the change-based production machine-learning model 328 when the service ticket's age reaches a pre-set threshold. The production escalation prediction system 324 can execute both production machine-learning models 326 and 328 simultaneously on a single service ticket, and then use a weighted sum of the escalation prediction probabilities from both production machine-learning models 326 and 328 as the final predicted escalation probability. When a service ticket is initiated, the production escalation prediction system 324 can use only the history-based probability from the history-based production machine-learning model 326. However, as the service ticket progresses, the change-based probability from the change-based production machine-learning model 328 can gradually override the history-based probability. In the situation when a new service company has no historical data or limited historical data, the production escalation prediction system 324 can use only the change-based probability from the change-based production machine-learning model 328.

Additionally, the production escalation prediction system 324 can employ final filtering steps that allow per-instance nuances to be taken into consideration. For example, after a service ticket's problem has been resolved, support engineers may leave the service ticket open for a few days in order to ensure that the proposed correction to the problem actually resolved the product user's problem. A service ticket that is in this final stage of its life cycle is unlikely to be escalated. The production escalation prediction system 324 can reduce the predicted probability of escalation for such a service ticket by examining service ticket metadata (such as service ticket status fields) or leveraging natural language processing techniques to detect this situation in the text of the final comments in the service ticket. Furthermore, a product user can inform a service agent that a service ticket may be closed for a variety of reasons, such as the problem was resolved, the problem is no longer an issue, or the problem disappeared. In these situations, the service ticket is unlikely to be escalated before the service ticket is finally closed by the service agent. The production escalation prediction system 324 can reduce the predicted probability of escalation for such a service ticket by using natural language processing techniques to analyze the final comments of the service ticket to determine whether these closure requests have been made.

As described above, the system 300 can detect a modified escalation risk created by the most recent service ticket interaction, which may be a communication of a reply improbability, a third party communication, the scheduling of a communication, a communication of a pending closure of the service ticket, a communication of a pending report of work by the product user, and/or a modification of a service level agreement. In many instances, these factors could be added as an input to for the change-based production machine-learning model 328 in the form of engineered features. However, a filter before or after the change-based production machine-learning model 328 may be preferable, as such a filter provides additional flexibility. For example, filters may be tweaked and tuned in real-time, without necessitating a retraining of the change-based production machine-learning model 328, which may be an expensive and time-consuming operation. Similarly, in many instances, if a single machine-learning model is deployed across multiple customers, the feature set used by the machine-learning model frequently defaults to the lowest common denominator, such as the feature set that is available across all customers. The system 300 can apply a filter before or after the change-based production machine-learning model 328 to leverage additional information for customers where this is available, or to tailor the change-based production machine-learning model 328 and its predictions to the nuances of the individual customer environments.

Furthermore, the system 300 can use subtle filtering, which is applying filters to escalation predictions only if the factors driving the escalation predictions are relevant to the purpose of a specific filter. For example, the change-based production machine-learning model 328 predicts that a service ticket with a modified service level agreement will be escalated after the original update requirement time of within the next 4 hours but before the modified update requirement time of within the next 6 hours. If the factors driving the escalation prediction are related to the service agent's responsiveness for updates, then the system 300 should apply the relaxed update requirement filter to the escalation prediction. However, if the factors driving the escalation prediction involved expressions of increased urgency by the customer, then the system 300 should ignore the application of the relaxed update requirement filter, which is less relevant. If any filters are applied to a modified escalation risk, the system 300 can use the modified escalation risk to modify the output of the change-based probability. For example, the system 300 uses a filter to suppress the predicted probability of Ann escalating her service ticket 100, because although the last comment 102 was from the customer and not answered, this last comment 102 from Ann implies that following Bob's advice corrected her problem, unlike the last comments in service tickets that are from customers and are not answered, which typically increase the predicted escalation probabilities. If no filters are applied to the modified escalation risk, the system 300 can use the modified escalation risk as a change factor that the change-based production machine-learning model 328 uses to modify the change-based probability. For example, the system 300 uses the last comment 102 from Ann, which implies that following Bob's advice corrected her problem, to reduce the predicted 2% probability of Ann escalating her service ticket 100 to a reduced 1% probability The production escalation prediction system 324 stores the results of the production machine-learning models 326 and/or 328, which may be queried via REST endpoints or made accessible via a user interface. This enables the production escalation prediction system 324 to provide a list of any associated static history factors and/or any dynamic change factors, ranked by importance, that explain why the production machine-learning models 326 and/or 328 have predicted a particular probability of escalation for a service ticket associated with a specific point in time. The production escalation prediction system 324 can generate this list of factors using a process that analyzes localized predictions for perturbations around the input datapoint and computes model-agnostic explanations for the prediction.

The system 300 optionally outputs a combined probability based on the history-based probability and the change-based probability that the product user escalates service for the service ticket. Outputting the combined probability may include outputting an explanation why a list of any relevant factors, ranked by importance, resulted in the prediction of the combined probability. Outputting the combined probability that the product user escalates service for the service ticket may include identifying service tickets which are similar to the service ticket and outputting any relevant factors associated with any identified service tickets which averted escalated service or efficiently handled escalated service, For example, the production escalation prediction system 324 combines the prediction of the 45% probability, which is based on history factors, with the prediction of the 95% probability, which is based on change factors, to result in a prediction of a weighted 75% probability which is based on a mix of factors, that Chris will escalate service within the next 4 hours. The production escalation prediction system 324 outputs the prediction of the 75% probability that Chris will escalate service within the next 4 hours, and the explanation that the prediction is based on 1) the last two comments which are Chris' frustrated responses to Dana's mount problem advice, which implies that Chris following Dana's advice failed to correct Chris' problem, 2) the lack of Dana's reply to Chris' responses within 5 hours, 3) Chris' history of frequently escalating services, and 4) Dana's limited experience solving the software product's problems. A combined probability can be the merging of likelihoods of something happening or being the case.

When the system 300 outputs the history-based probability, the change-based probability, and/or the combined probability that a product user escalates service for a service ticket, it would not always be optimal for a service agent to review service tickets strictly by their escalation probability because preventing some escalations will be more important than preventing other escalations. For example, if the change-based production machine-learning model 328 predicts the same escalation probability of 50% for the service tickets from both Acme Company and MegaCorp., and MegaCorp. is twice as valuable (in terms of economic value such as deal size or strategic importance) as Acme Company is to a service agent's organization, then the service agent should respond first to MegaCorp.'s service ticket because MegaCorp.'s escalations will be more costly. Consequently, the more valuable that a customer is to a service organization, the more important it is to ensure customer satisfaction and prevent escalations. Therefore, important customers' service tickets that have even a modest likelihood of escalation should be triaged by the service organization, even if the majority of the escalation predictions for these service tickets are potentially false positives. In contrast, less significant customers' service tickets may need to have a significantly greater probability of escalation before a service agent takes any action because of the non-zero cost associated with any intervention.

Therefore, a service company administrator can set a probability threshold that determines when and how the system 300 outputs the history-based probability, the change-based probability, and/or the combined probability that a product user escalates service for a service ticket. Given that any service organization has finite resources, probability thresholds may be based on many factors, such as an economic value associated with the product user, an initial service contract stage associated with the product user, a service contract renewal date associated with the product user, and a service contract renewal risk associated with the product user. Additional factors that probability thresholds may be based upon include a quality of services provided to the product user, any escalations of service and any service tickets that were initiated by the product user, any products used by the product user, and an impact of a problem associated with the service ticket. A probability threshold can be the magnitude or intensity that a likelihood must satisfy for a certain result to occur. An economic value can be the measure of a service organization's benefit from providing a service to a product user.

A probability threshold may be based on an initial service contract stage associated with a customer. For example, the system 300 sets a low probability threshold for a new customer's service tickets to ensure that the new customer's first interactions with service agents are flawless. An initial service contract stage can be the primary phase of an agreement to support a product user.

A probability threshold can be based on a service contract renewal date associated with a customer. For example, the system 300 sets a low probability threshold for a customer's service tickets based on the customer's subscription renewal date because deals may be lost if a customer's impression of a product or a service organization is impacted at critical times. Providing "white glove" treatment for a customer approaching a renewal date improves the likeliness of the customer renewing their service contract A service contract renewal date can be a time to decide to extend an agreement to support a product user.

A probability threshold may be based on a service contract renewal risk associated with a customer. For example, the system 300 sets the probability threshold for a customer's service tickets based on the customer's churn risk. Customers that have been flagged as a potential churn risk should also receive special attention if it is believed that the customer's account may be saved. Conversely, if a customer has decided not to renew their service contract, preventing escalations from the customer is likely of lower importance and benefit. A service contract renewal risk can be a possibility of a product user not extending an agreement to support the product user.

A probability threshold may be based on the historical quality of services provided to a customer. For example, the system 300 sets a low probability threshold for a customer's service tickets based on the customer's negative experience in previous service interactions. Customers may forgive the occasional poor experience with a service agent. However, if poor service becomes the norm, the customer experience may reach a point of negativity whereby that customer may be willing to terminate a business relationship. Examining a customer's recent experiences with service agents and providing early/proactive intervention for customers that have experienced poor support is critical to improving the customer relationship and increasing the likelihood of continued business with that customer.

A probability threshold may be based on escalations of service associated with a customer. For example, the system 300 sets a low probability threshold for a customer's service tickets based on the customer's recent spate of escalations. Customers that have been forced to escalate a relatively large number of service tickets in the recent past should be closely monitored to ensure that every precaution is taken to prevent further missteps.

A probability threshold may be based on an impact of a problem of a service ticket associated with a customer. For example, the system 300 sets the probability threshold for a customer's service ticket based on the impact of the service ticket's problem. The customer impact associated with different types of service ticket problems can range from significant to insignificant. Service tickets which are producing a more severe disruption to the customer are obviously more important to prevent from escalating. An impact can be the effect of one thing on another thing. A problem can be an issue that needs to be dealt with and overcome.

Based on these factors, a system administrator can customize the probability threshold at which a prediction is output to a service agent on a per service ticket basis. This customization of a probability threshold occurs after the system trained the change-based production machine-learning model 328 and the customized probability threshold may be a separate filter between the change-based production machine-learning model 328 and the user interface and application programming interface providing the escalation prediction to service agents. These factors may be used to generate the expected cost of an escalation for each customer, E(cost|escalation). Multiplying this estimate by the change-based production machine-learning model 328's escalation probabilities, Prob(escalation) produces the expected escalation-related costs, E(cost) for each open service ticket, and optimizes service agents' efforts to the highest value service tickets. E(cost)=Prob(escalation)*E(cost|escalation).

When a predicted probability exceeds a probability threshold, the system 300 can output an alert to the service agent responsible for the service ticket, or the service agent's supervisor, and/or the system 300 can output the service ticket to the user interface of the service agent and/or supervisor. Further, when a predicted probability exceeds a specific probability threshold, the system 300 can provide alerts to additional teams, such as sales and product development teams. Since the probability threshold can differ by customer, product type, size of account, proximity to contract renewal, overall customer sentiment, potential churn risk, a quality of services provided, escalations of service, service tickets initiated, and impacts of problems, etc., the probability threshold does not need to be the same across all service tickets. An alert can be a warning.

The system 300 can continuously recompute the escalation probability as the service ticket evolves, thereby providing the service company with a continuous view of a service ticket's status as time progresses. When deployed into production, the system 300 for high fidelity escalation predictions can display the escalation predictions being generated to the service agents and/or escalation managers that are managing the prediction queue. As discussed above, these escalation predictions are generally accompanied by an explanation of the escalation prediction, such as the factors that are driving the escalation prediction, which makes the escalation predictions significantly more actionable. When a service agent is presented with an escalation prediction that a service ticket is at risk of escalation, the service agent can review the factors driving the escalation prediction, review the service ticket, and then take action and intervene in the service ticket (either directly or indirectly), or decide that no action is necessitated. The system 300 enables service agents to review a probability that a product user will escalate a service ticket, to review the output of the probability to the service agent who is responsible for the service ticket, to review queues of service tickets that are at risk of escalation, and to provide feedback by acknowledging, dismissing, or pausing the reviewed information. After learning from this feedback, the system 300 will be more effective at generating a probability that a product user will escalate a service ticket, determining a probability threshold that the probability must satisfy to output an alert to the service agent who is responsible for the service ticket, and managing the queues of service tickets that are at risk of escalation.

The feedback functionality may be based on a service agent acknowledging any change-based probability. A service agent can acknowledge an escalation prediction, which indicates that the service agent took action based on the escalation prediction. The system 300 can use this acknowledgement to move an escalation prediction to a separate queue of service tickets, temporarily suppress an escalation prediction to help a service agent "clear their queue," provide information to other service agents that the escalation prediction has already been handled, and/or provide feedback for training future versions of the change-based production machine-learning model 328, indicating that the service agent agreed with the escalation prediction. Acknowledging can be agreeing with the validity of a prediction.

The feedback functionality may be based on a service agent dismissing any change-based probability, A service agent can dismiss an escalation prediction, which indicates that the service agent does not agree with the prediction that this service ticket is at risk of escalation. By providing dismiss support, the system 300 enables a service agent to clean-up erroneous escalation predictions from their queue, which provides invaluable feedback for future versions of the change-based production machine-learning model 328. Dismissing can be rejecting the validity of a prediction.

The feedback functionality may be based on a service agent pausing the output of any change-based probability and/or the output of any alert associated with any change-based probability, A service agent can pause an escalation prediction, which indicates that the service agent thinks that a service ticket that is predicted to be escalated does not yet require intervention, but the service agent does not want to dismiss the service ticket. The pause functionality allows a service agent to hide a prediction of escalation for a user-selected amount of time, such as 1-day or 3 business days. Pausing can be temporarily stopping an action.

The system 300 can enable the service agent to provide explicit feedback about why the service agent selected an option to acknowledge, dismiss, or pause a prediction. For example, if a service agent is dismissing a prediction, the system 300 can provide an option to answer multiple choice questions or enter free format text to explain why the agent thinks that the prediction is wrong. The production escalation prediction system 324 can integrate with a feedback loop, which captures information from the user interface or interaction layer and incorporates the captured information as inputs to the machine-learning models 320, 322, 326, and/or 328. The information captured is in essence the escalation management team's follow-up behavior on the predictions, as recorded via the user interface.

Sweeping in these follow-up actions back into the machine-learning models 320, 322, 326, and/or 328 can enable the machine-learning models 320, 322, 326, and/or 328 to be retrained in a manner that closely follows the human-decision making component, which the production escalation prediction system 324 attempts to model. This feedback loop can enable the machine-learning models 320, 322, 326, and/or 328 to evolve in a personalized manner with respect to the preferences of the escalation management team, in a way that is relevant to the team. Furthermore, the production escalation prediction system 324 can include key metrics captured from the user interface or interaction layer, such as page share counts and number of views (eyeballs), in order to account for implicit prioritizations from a service team's senior management personnel. This can enable the system 300 to refine the machine-learning models 320, 322, 326, and/or 328 over time as additional data are gathered from the user interface about factors that may impact escalation probability beyond the immediate product user-service agent interactions in a ticketing system's service ticket itself.

Since the production escalation prediction system 324 evaluates a multitude of interactions between entities that can impact escalation, the production escalation prediction system 324 can capture information about not only whether a current service ticket is likely to be escalated, but also information about similar service tickets in the past that had averted escalations, or handled escalated service tickets efficiently. This crucial knowledge of service ticket arcs can provide a service company with a holistic view of the various factors the service company can act upon to direct a service ticket on the path to successful resolution in a way that also ensures user happiness. User happiness in such a case could be dependent upon assigning the appropriate service personnel, resources, prompter responses, and an improved quality of responses. In doing so, the production escalation prediction system 324 is a proactive and personalized solution towards user satisfaction, rather than a generic diagnosis based on readily available service ticket metrics. The production escalation prediction system 324 can empower service companies to strengthen their relationships with users, enabling the service companies to maintain standards of accountability and, as a consequence, maintain a high degree of user satisfaction.

The system 300 may be deployed as one combined model, or one combined model per product, region, customer, etc. Since certain support ticketing systems do not have an explicit escalation tag or type, an escalation event is not necessary, as the system 300 can predict other labels, such as "at-risk." As long as problematic service tickets are labelled to form a training set, the system 300 can predict the probabilities of problematic or at-risk service tickets. Furthermore, the entities that the production escalation prediction system 324 analyzes are relevant even beyond the support domain, because factors extracted from these entities and their evolving relationships may be used to model behavior patterns in other business workflows which operate on the assumption of the desire for continuously sustained business relationships between the user and a company across multiple product cycles. Examples of such industries where the system 300 may be successfully applied are the pharmaceutical, healthcare and medical devices industry, as well as the consumer electronics industry.

Figure 4:
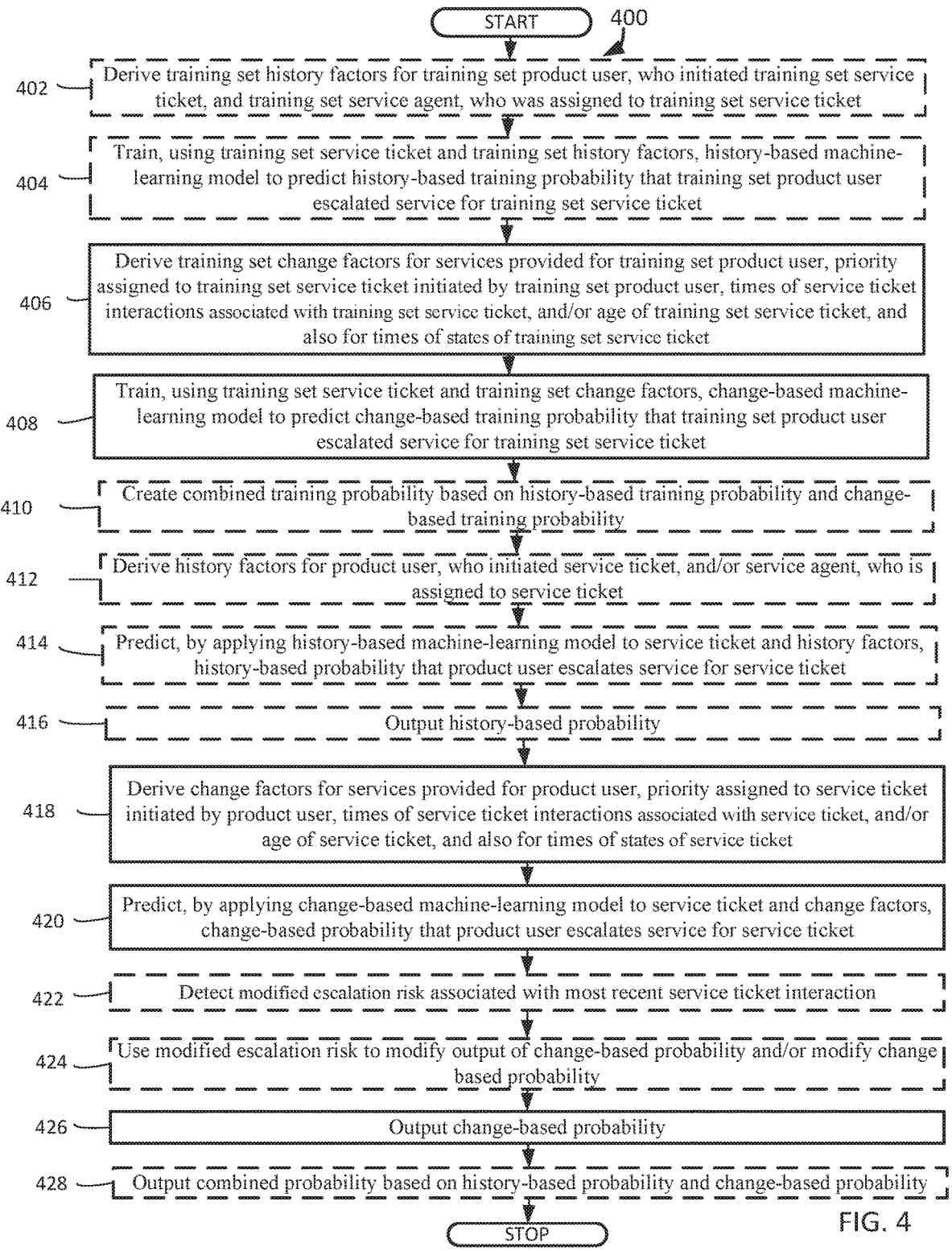
FIG. 4 is a flowchart that illustrates a computer-implemented method for high fidelity predictions of service ticket escalation, under an embodiment.

FIG. 4 is a flowchart that illustrates a computer-implemented method for high fidelity predictions of service ticket escalation, under an embodiment. Flowchart 400 depicts method acts illustrated as flowchart blocks for certain actions involved in and/or between the system elements 302-328 of FIG. 3.

A training set's history factors of the training set's product user, who initiated the training set's service ticket, and/or the training set's service agent, who was assigned to the training set's service ticket, are optionally derived, block 402. The system 300 derives a training set's history factors used to train a model to predict service escalation. For example, and without limitation, this can include the training escalation prediction system 318 receiving training set data that includes a technical support ticket that contains the initial interactions 100 between the software product user Ann and the technical support agent Bob concerning a remote mount problem, as depicted by FIG. 1, Continuing the example, the training escalation prediction system 318 derives the training set's history factors which indicate that Ann previously initiated 1 technical support ticket, Bob solved her previous problem in 15 minutes, and Ann's employer purchased a basic service level agreement for the software product, which is the support company's only product that Ann's employer uses.

After the derivation of the training set's history factors, the training set's service ticket and the training set's history factors are optionally used to train a history-based machine-learning model to predict a history-based training probability that the training set's product user escalated service for the training set's service ticket, block 404. The system 300 uses a training set's history factors to train a model to predict service escalation. By way of example and without limitation, this can include the history-based training machine-learning model 320 using Ann's history of never escalating a service, Ann's recent stage as a new user in the sales cycle of a software product that has been sold for a significant time, and Bob's recent stage as a senior technical support agent with experience solving the software product's problems to predict a 5% probability that Ann escalated her service ticket within 90 days of initiation.

Following the prediction of the history-based training probability that the training set's product user escalated service for the training set's service ticket, the training set's change factors are derived for services provided for the training set's product user who initiated the training set's service ticket, a priority assigned to the training set's service ticket, times of service ticket interactions with the training set's service agent, states and corresponding times associated with the training set's service ticket, and/or an age of the training set's service ticket, block 406. The system 300 derives a training set's change factors used to train to a model to predict service escalation. In embodiments, this can include the training escalation prediction system 318 receiving training set data that includes the technical support ticket that contains all subsequent interactions 102 between the software product user Ann and the technical support agent Bob concerning the remote mount problem, and the technical support ticket's metadata 104, as depicted by FIG. 1. Continuing the example, the training escalation prediction system 318 derives the training set's change factors which indicate that Bob was the only technical support agent who replied to Ann, that Bob did not request any information from Ann, two of their three interactions included machine text, that Ann did not change the ticket's priority, and the most recent comment was Ann's response thanking Bob for his advice, and the time series data's timestamps 106 indicate that Ann's thanks was before the first hourly observation of the service ticket's state after the ticket's initiation.

Having derived a training set's change factors, the training set's service ticket and the training set's change factors are used to train a change-based machine-learning model to predict a change-based training probability that the training set's product user escalated service for the training set's service ticket, block 408. The system 300 uses a training set's changes factors to train a model to predict service escalation. For example, and without limitation, this can include the change-based training machine-learning model 322 using the technical support ticket's unchanging priority, and the natural language processing of the last comment as Ann's thankful response to Bob's mount problem advice within 35 minutes of the service ticket's initiation, which implies that Ann following Bob's advice corrected Ann's problem, to predict a 1% probability that Ann escalated her service ticket within 90 days of initiation. Then the change-based training machine-learning model 322 accesses the time series data's timestamps 106 which indicate that Ann closed the service ticket on Wednesday at 2:45 P.M., which confirms the 1% escalation prediction by the change-based training machine-learning model 322.

After predicting the history-based and change-based training probabilities that the training set's product user escalated service for the training set's service ticket, a combined training probability that the training set's product user escalated service for the training set's service ticket is optionally created based on the history-based training probability and the change-based training probability, block 410. The system 300 trains a model to predict service escalation based on combined training probabilities. By way of example and without limitation, this can include the training escalation prediction system 318 combining the prediction of the 5% probability, which is based on the training set's history factors, with the prediction of the 1% probability, which is based on the training set's change factors, to result in a prediction of a weighted 2.5% probability, which is based on a mix of training set factors, that Ann escalated her service ticket within 90 days of initiation. The training escalation prediction system 318 can use the combined training probability, the history-based training probability, and/or the change-based training probability to train the training machine-learning models 320 and/or 322.

Following the training to predict service escalation probabilities, history factors are optionally derived for a product user, who initiated a service ticket, and/or a service agent, who is assigned to the service ticket, block 412. The system 300 derives the history factors for a model to predict service escalation. In embodiments, this can include the production escalation prediction system 324 receiving online production data that includes a pending urgent technical support ticket that contains the initial interactions 200 between the software product user Chris and the technical support agent Dana concerning a remote mount problem, as depicted by FIG. 2, Continuing the example, the production escalation prediction system 324 derives history factors which indicate that Chris previously initiated 19 technical support tickets and escalated 9 of these tickets, Dana was the technical support agent for all of Chris' tickets, and Chris' employer upgraded to a stricter service level agreement for the software product, which is among 5 of the support company's products that Chris' employer uses.

Having derived history factors, the history-based machine-learning model is optionally applied to the service ticket and the history factors to predict a history-based probability that the product user escalates service for the service ticket, block 414. The system 300 applies history factors to a model to predict service escalation. For example, and without limitation, this can include the history-based production machine-learning model 326 using Chris' history of frequently escalating services, including when Dana was the technical support agent, Dana's recent stage as a junior technical support agent with limited experience solving the software product's problems, and Chris' employer upgrade to a stricter service level agreement for the software product to predict a 45% probability that Chris will escalate service within the next 4 hours.

After the history-based escalation probability that the product user escalates service for the service ticket is predicted, the history-based probability is optionally output, block 416. The system 300 outputs the history-based probability that a product user will escalate service. By way of example and without limitation, this can include the history-based production machine-learning model 326 outputting the prediction of the 45% probability that Chris will escalate service within the next 4 hours, and the explanation that the prediction is based on 1) Chris' history of frequently escalating services, 2) Dana's limited experience solving the software product's problems, and 3) the stricter service level agreement for the software product.

Having optionally predicted a history-based escalation probability that the product user escalates service for the service ticket, change factors are derived for services provided for a product user who initiated a service ticket, a priority assigned to the service ticket, times of service ticket interactions with a service agent, states and corresponding times associated with the training set's service ticket, and/or an age of the service ticket, block 418. The system 300 derives change factors for a model to predict service escalation. In embodiments, this can include the production escalation prediction system 324 receiving online production data that includes the pending urgent technical support ticket that contains all subsequent interactions 202 and 204 between the software product user Chris and the technical support agent Dana concerning the remote mount problem, and the technical support ticket's metadata 206, as depicted by FIG. 2. Continuing the example, the production escalation prediction system 324 derives subsequent change factors which indicate that Chris changes the ticket's priority to urgent, the most recent comments were Chris' second request for help, which implies that Dana's advice was ineffective, and Chris's frustrated "Hello?", the time series data's timestamps 208 which indicate that Chris' implied rejection of Dana's advice was before the first hourly observation of the service ticket's state after the ticket's initiation, and the lack of Dana's reply to Chris' second request for help within the next 5 hourly observations After deriving change factors, the change-based machine-learning model is applied to the service ticket and the change factors to predict a change-based probability that the product user escalates service for the service ticket, block 420. The system 300 applies changes factors to a model to predict service escalation. For example, and without limitation, this can include the change-based production machine-learning model 328 using the technical support ticket's new urgent priority, the natural language processing of Chris' frustrated responses to Dana's mount problem advice, which implies that Chris following Dana's advice failed to correct Chris' problem, and the lack of Dana's reply to Chris' responses within 5 hours to predict a 95% probability that Chris will escalate service within the next 4 hours.

When predicting a change-based probability that a product user escalates service for a service ticket, a modified escalation risk associated with a most recent service ticket interaction of the service ticket interactions is optionally detected, block 422. The system detects last comments in service tickets that are from customers and are not answered, but which should not increase the predicted escalation probabilities. By way of example and without limitation, this can include the change-based production machine-learning model 328 detecting the last comment 102 in Ann's service ticket 100 was from the customer and not answered, but this last comment 102 from Ann implies that following Bob's advice corrected her problem, unlike the last comments in service tickets that are from customers and are not answered, which typically increase the predicted escalation probabilities.

If a modified escalation risk is detected, the modified escalation risk is optionally used to modify the output of the change-based probability or modify the change-based probability, block 424. The system modifies the predicted escalation probability or its output based on last comments in service tickets that are from customers and are not answered, but which should not increase the predicted escalation probabilities. In embodiments, this can include the change-based production machine-learning model 328 using a filter to suppress the predicted probability of Ann escalating her service ticket 100, because although the last comment 102 was from the customer and not answered, this last comment 102 from Ann implies that following Bob's advice corrected her problem, unlike the last comments in service tickets that are from customers and are not answered, which typically increase the predicted escalation probabilities.

If no filters are applied to the modified escalation risk, the system 300 can use the modified escalation risk as a change factor that the change-based training machine-learning model 322 uses to modify the change-based probability. For example, the system 300 uses the last comment 102 from Ann, which implies that following Bob's advice corrected her problem, to reduce the predicted 2% probability of Ann escalating her service ticket 100 to a reduced 1% probability.

Following the prediction of the change-based escalation probability that the product user escalates service for the service ticket, the change-based probability is output, block 426. The system 300 outputs the change-based probability that a product user will escalate service. By way of example and without limitation, this can include the change-based production machine-learning model 328 outputting the prediction of the 95% probability that Chris will escalate service within the next 4 hours, and the explanation that the prediction is based on 1) the last two comments which are Chris' frustrated responses to Dana's mount problem advice, which implies that Chris following Dana's advice failed to correct Chris' problem, 2) the lack of Dana's reply to Chris' responses within 5 hours, and 3) the technical support ticket's new urgent priority.

Having predicted the history-based and change-based escalation probabilities that the product user escalates service for the service ticket, a combined probability that the product user escalates service for the service ticket based on the history-based probability and the change-based probability is optionally output, block 428. The system 300 outputs the combined probability that a product user will escalate service. In embodiments, this can include the production escalation prediction system 324 combining the prediction of the 45% probability, which is based on history factors, with the prediction of the 95% probability, which is based on change factors, to result in a prediction of a weighted 75% probability, which is based on a mix of factors, that Chris will escalate service within the next 4 hours. The production escalation prediction system 324 outputs the prediction of the 75% probability that Chris will escalate service within the next 4 hours, and the explanation that the prediction is based on 1) Chris' quick and frustrated responses to Dana's mount problem advice, which implies that Chris following Dana's advice failed to correct Chris' problem, 2) the lack of Dana's reply to Chris' responses, 3) Chris' history of frequently escalating services, and 4) Dana's limited experience solving the software product's problems.

Although FIG. 4 depicts the blocks 402-428 occurring in a specific order, the blocks 402-428 can occur in another order. In other implementations, each of the blocks 402-428 can also be executed in combination with other blocks and/or some blocks may be divided into a different set of blocks.

Figure 5:
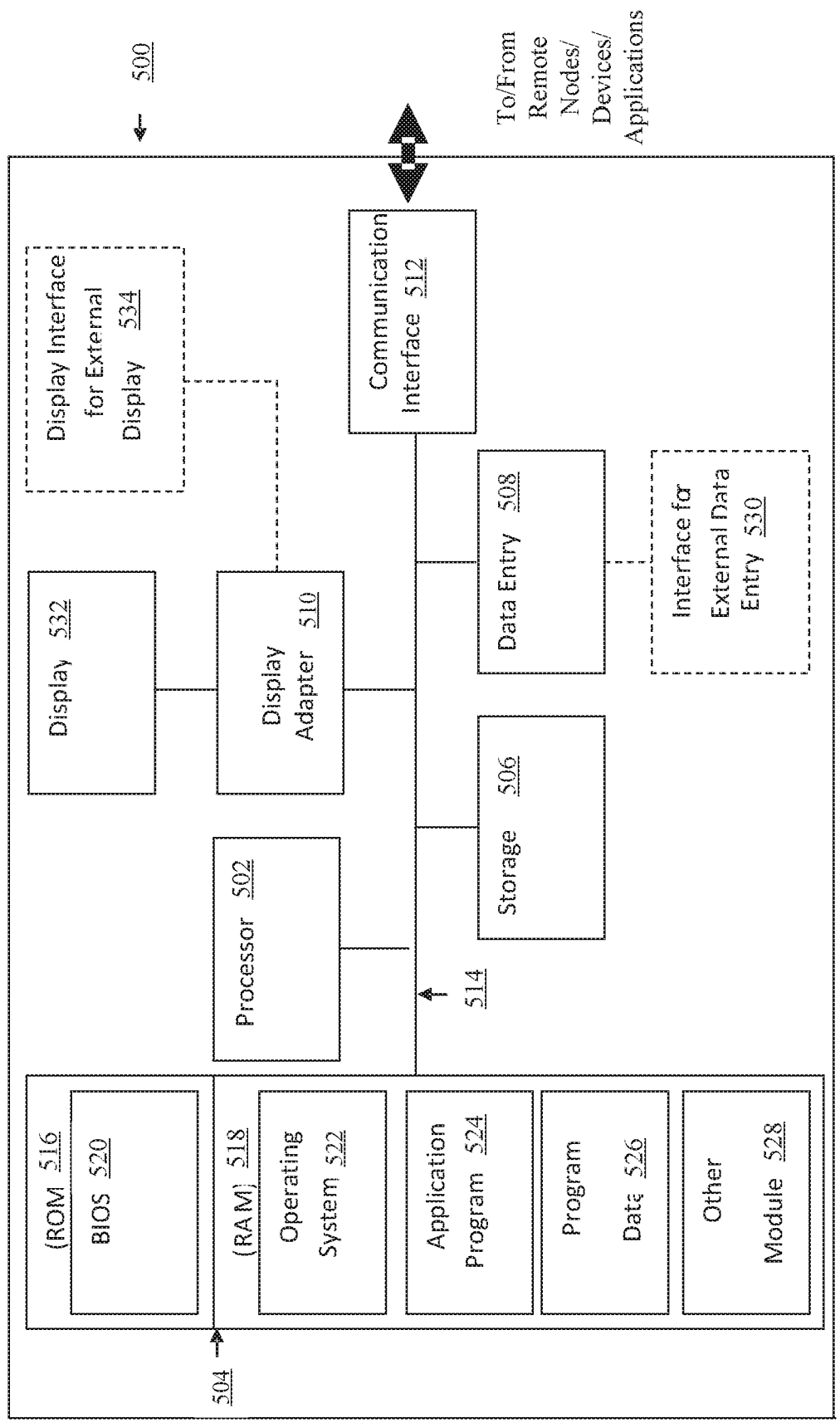
FIG. 5 is a block diagram illustrating an example hardware device in which the subject matter may be implemented.

In exemplary hardware device in which the subject matter may be implemented shall be described. Those of ordinary skill in the art will appreciate that the elements illustrated in FIG. 5 can vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 can comprise any type of bus architecture. Examples include a memory bus, a peripheral bus, a local bus, etc. The processing unit 502 is an instruction execution machine, apparatus, or device and can comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 can include a read only memory (ROM) 516 and a random access memory (RAM) 518. The memory 504 may be configured to store program instructions and data during operation of the hardware device 500. In various embodiments, the memory 504 can include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 can also include nonvolatile memory technologies such as nonvolatile flash RAM (NVRAM) or ROM. In some embodiments, it is contemplated that the memory 504 can include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 can include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like can also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user can enter commands and information into the hardware device 500 through data entry module 508. The data entry module 508 can include mechanisms such as a keyboard, a touch screen, a pointing device, etc. Other external input devices (not shown) are connected to the hardware device 500 via an external data entry interface 530. By way of example and not limitation, external input devices can include a microphone, joystick, game pad, satellite dish, scanner, or the like. In some embodiments, external input devices can include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, can function as both the data entry module 508 and the display 532. External display devices can also be connected to the bus 514 via the external display interface 534. Other peripheral output devices, not shown, such as speakers and printers, may be connected to the hardware device 500.

The hardware device 500 can operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 can interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 can include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter can also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for high fidelity predictions of service ticket escalation, the system comprising:
    one or more processors; and
    a non-transitory computer readable medium storing a plurality of instructions, which when executed, cause the one or more processors to:
    derive a training set change factor for a periodic observation that service ticket interactions associated with the training set service ticket include a response to a request from the training set product user which natural language processing detects as a non-substantive response, such that the service ticket interactions continue to lack a substantive response to a request from the training set product user;
    train, using the training set service ticket, the training set change factor, and a change-based machine-learning model to predict a change-based training probability that the training set product user escalated service for the training set service ticket;
    derive a change factor for a periodic observation that service ticket interactions associated with the service ticket includes a response to a request from the product user which natural language processing detects as a non-substantive response, such that the service ticket interactions continue to lack a substantive response to a request from the product user;
    predict, by applying the change-based machine-learning model to the service ticket and the change factor, a change-based probability that the product user escalates service for the service ticket;
    output the change-based probability; and
    retrain, using data which includes the service ticket, the change factor, and the change-based probability, the change-based machine-learning model to predict a subsequent change-based training probability that a subsequent product user escalated service for a subsequent service ticket.

2. The system of claim 1, wherein the plurality of instructions further causes the processor to:
    detect a modified escalation risk associated with a most recent service ticket interaction of the service ticket interactions associated with the service ticket; and
    use the modified escalation risk to one of modify an output of the change-based probability and modify the change-based probability, wherein the most recent service ticket interaction comprises at least one of a communication of a reply improbability, a third party communication, an automated response, a scheduling of a communication, a communication of a pending closure of the service ticket, a communication of a pending report of work by the product user, and a modification of a service level agreement.

3. The system of claim 1, wherein the training set change factors further comprise a modified escalation risk associated with a most recent service ticket interaction of the service ticket interactions associated with the training set service ticket, and change factors further comprise a modified escalation risk associated with a most recent service ticket interaction of the service ticket interactions associated with the service ticket, wherein any most recent service ticket interaction comprises at least one of a communication of a reply improbability, a third party communication, an automated response, a scheduling of a communication, a communication of a pending closure of any service ticket, a communication of a pending report of work by any product user, and a modification of a service level agreement.

4. The system of claim 1, wherein the change-based probability is based on applying natural language processing to the service ticket interactions associated with the service ticket to identify a lack of progress with a problem associated with the service ticket.

5. The system of claim 1, wherein at least one of outputting the change-based probability and outputting an alert to a service agent who is responsible for the service ticket is in response to the change-based probability satisfying a probability threshold that is based on at least one of an economic value associated with the product user, an initial service contract stage associated with the product user, a service contract renewal date associated with the product user, a service contract renewal risk associated with the product user, a quality of services provided to the product user, any escalations of service and any service tickets that were initiated by the product user, and an impact of a problem associated with the service ticket.

6. The system of claim 5, wherein at least one of the change-based probability and outputting the change-based probability is based at least one of another service agent acknowledging another change-based probability, the other service agent dismissing the other change-based probability, and the other service agent pausing at least one of an output of the other change-based probability and an output of an alert associated with the other change-based probability.

7. A computer-implemented method for high fidelity predictions of service ticket escalation, the computer-implemented method comprising:
    deriving training set change factor for a periodic observation that-service ticket interactions associated with the training set service ticket include a response to a request from the training set product user which natural language processing detects as a non-substantive response, such that the service ticket interactions continue to lack a substantive response to a request from the training set product user;

training, using the training set service ticket, the training set change factor, and a change-based machine-learning model to predict a change-based training probability that the training set product user escalated service for the training set service ticket;

deriving a change factor for a periodic observation that service ticket interactions associated with the service ticket includes a response to a request from the product user which natural language processing detects as a non-substantive response, such that the service ticket interactions continue to lack a substantive response to a request from the product user;

predicting, by applying the change-based machine-learning model to the service ticket and the change factor, a change-based probability that the product user escalates service for the service ticket;

outputting the change-based probability; and retraining, using data which includes the service ticket, the change factor, and the change-based probability, the change-based machine-learning model to predict a subsequent change-based training probability that a subsequent product user escalated service for a subsequent service ticket.

8. The computer-implemented method of claim 7, wherein the computer-implemented method further comprises:

detecting a modified escalation risk associated with a most recent service ticket interaction of the service ticket interactions associated with the service ticket; and using the modified escalation risk to one of modify an output of the change-based probability and modify the change-based probability, wherein the most recent service ticket interaction comprises at least one of a communication of a reply improbability, a third party communication, an automated response, a scheduling of a communication, a communication of a pending closure of the service ticket, a communication of a pending report of work by the product user, and a modification of a service level agreement.

9. The computer-implemented method of claim 7, wherein the training set change factors further comprise a modified escalation risk associated with a most recent service ticket interaction of the service ticket interactions associated with the training set service ticket, and change factors further comprise a modified escalation risk associated with a most recent service ticket interaction of the service ticket interactions associated with the service ticket, wherein any most recent service ticket interaction comprises at least one of a communication of a reply improbability, a third party communication, an automated response, a scheduling of a communication, a communication of a pending closure of any service ticket, a communication of a pending report of work by any product user, and a modification of a service level agreement.

10. The computer-implemented method of claim 7, wherein the change-based probability is based on applying natural language processing to the service ticket interactions associated with the service ticket to identify a lack of progress with a problem associated with the service ticket.

11. The computer-implemented method of claim 7, wherein at least one of outputting the change-based probability and outputting an alert to a service agent who is responsible for the service ticket is in response to the change-based probability satisfying a probability threshold that is based on at least one of an economic value associated with the product user, an initial service contract stage associated with the product user, a service contract renewal date associated with the product user, a service contract renewal risk associated with the product user, a quality of services provided to the product user, any escalations of service and any service tickets that were initiated by the product user, and an impact of a problem associated with the service ticket.

12. The computer-implemented method of claim 11, wherein at least one of the change-based probability and outputting the change-based probability is based at least one of another service agent acknowledging another change-based probability, the other service agent dismissing the other change-based probability, and the other service agent pausing at least one of an output of the other change-based probability and an output of an alert associated with the other change-based probability.

13. A computer program product, comprising a non-transitory computer-readable medium having a computer-readable program code embodied therein to be executed by one or more processors, the program code including instructions to:

derive a training set change factor for a periodic observation that-service ticket interactions associated with the training set service ticket includes a response to a request from the training set product user which natural language processing detects as a non-substantive response, such that the service ticket interactions continue to lack a substantive response to a request from the training set product user;

train, using the training set service ticket, the training set change factor, and a change-based machine-learning model to predict a change-based training probability that the training set product user escalated service for the training set service ticket;

derive a change factor for a periodic observation that service ticket interactions associated with the service ticket includes a response to a request from the product user which natural language processing detects as a non-substantive response, such that the service ticket interactions continue to lack a substantive response to a request from the product user;

predict, by applying the change-based machine-learning model to the service ticket and the change factor, a change-based probability that the product user escalates service for the service ticket;

output the change-based probability; and retrain, using data which includes the service ticket, the change factor, and the change-based probability, the change-based machine-learning model to predict a subsequent change-based training probability that a subsequent product user escalated service for a subsequent service ticket.

14. The computer program product of claim 13, wherein the program code includes further instructions to:

detect a modified escalation risk associated with a most recent service ticket interaction of the service ticket interactions associated with the service ticket; and use the modified escalation risk to one of modify an output of the change-based probability and modify the change-based probability, wherein the most recent service ticket interaction comprises at least one of a communication of a reply improbability, a third party communication, an automated response, a scheduling of a communication, a communication of a pending closure of the service ticket, a communication of a pending report of work by the product user, and a modification of a service level agreement.

15. The computer program product of claim 13, wherein the training set change factors further comprise a modified escalation risk associated with a most recent service ticket interaction of the service ticket interactions associated with the training set service ticket, and change factors further comprise a modified escalation risk associated with a most recent service ticket interaction of the service ticket interactions associated with the service ticket, wherein any most recent service ticket interaction comprises at least one of a communication of a reply improbability, a third party communication, an automated response, a scheduling of a communication, a communication of a pending closure of any service ticket, a communication of a pending report of work by any product user, and a modification of a service level agreement.

16. The computer program product of claim 13, wherein the change-based probability is based on applying natural language processing to the service ticket interactions associated with the service ticket to identify a lack of progress with a problem associated with the service ticket.

17. The computer program product of claim 13, wherein at least one of outputting the change-based probability and outputting an alert to a service agent who is responsible for the service ticket is in response to the change-based probability satisfying a probability threshold that is based on at least one of an economic value associated with the product user, an initial service contract stage associated with the product user, a service contract renewal date associated with the product user, a service contract renewal risk associated with the product user, a quality of services provided to the product user, any escalations of service and any service tickets that were initiated by the product user, and an impact of a problem associated with the service ticket, and wherein at least one of the change-based probability and outputting the change-based probability is based at least one of another service agent acknowledging another change-based probability, the other service agent dismissing the other change-based probability, and the other service agent pausing at least one of an output of the other change-based probability and an output of an alert associated with the other change-based probability.

\* \* \* \* \*